US010852142B2

(12) United States Patent
Caute et al.

(10) Patent No.: US 10,852,142 B2
(45) Date of Patent: Dec. 1, 2020

(54) DUAL-AXIS ELECTROMAGNETIC SPEED SENSOR WITH DEPTH

(71) Applicant: Airmar Technology Corporation, Milford, NH (US)

(72) Inventors: Didier Caute, Lorient (FR); Danny J. Fladung, Grantham, NH (US); Craig Smith, Manchester, NH (US); Robert M. Cullen, Temple, NH (US); William J. Letendre, Temple, NH (US); Eric J. Beiswenger, Amherst, NH (US); Bruno Marie, Ploemeur (FR)

(73) Assignee: Airmar Technology Corporation, Milford, NH (US)

( * ) Notice: Subject to any disclaimer, the term of this patent is extended or adjusted under 35 U.S.C. 154(b) by 216 days.

(21) Appl. No.: 16/185,768

(22) Filed: Nov. 9, 2018

(65) Prior Publication Data

US 2019/0145777 A1    May 16, 2019

Related U.S. Application Data

(60) Provisional application No. 62/586,050, filed on Nov. 14, 2017.

(51) Int. Cl.
*G01C 21/16* (2006.01)
*G01P 3/52* (2006.01)
(Continued)

(52) U.S. Cl.
CPC ............ *G01C 21/165* (2013.01); *G01P 3/488* (2013.01); *G01P 3/52* (2013.01); *G01S 15/08* (2013.01); *G01S 15/10* (2013.01); *G01S 15/86* (2020.01)

(58) Field of Classification Search
CPC ...... G01C 21/16; G01C 21/165; G01C 25/00; G01C 21/20; G01C 23/00; G01C 23/005; G01C 21/203; G01C 21/26; G01C 21/32; G01C 17/38; G01C 21/00; G01C 21/005; G01C 21/10; G01C 21/18; G01C 21/265; G01C 21/30; G01C 21/3461; G01C 21/3614; G01C 22/006; G01C 9/00; G01C 13/008; G01C 19/20; G01C 19/56;
(Continued)

(56) References Cited

U.S. PATENT DOCUMENTS 5,231,876 A * 8/1993 Peet, II ............... G01P 13/02
73/170.08
9,513,373 B2 12/2016 Rolt et al.
(Continued)

FOREIGN PATENT DOCUMENTS

EP    3401700 A1    11/2018

OTHER PUBLICATIONS

Electromagnetic Log Pre Release Bulletin by Airmar Technology Corporation dated Jun. 21, 2016 (13 pages).
(Continued)

*Primary Examiner* — Andre J Allen
(74) *Attorney, Agent, or Firm* — Hamilton, Brook, Smith & Reynolds, P.C.

(57) ABSTRACT

A multi-function sensor system comprises a dual-axis electromagnetic speed sensor and a depth transducer to enable various underwater or marine measurements to be achieved in a single unit thus reducing the space required on a vessel and the cost of having such multiple functions.

22 Claims, 20 Drawing Sheets

(51) Int. Cl.
*G01S 15/08* (2006.01)
*G01P 3/488* (2006.01)
*G01S 15/10* (2006.01)
*G01S 15/86* (2020.01)

(58) Field of Classification Search
CPC ............ G01C 19/5719; G01C 19/5776; G01C 21/206; G01C 21/24; G01C 21/3407; G01C 21/3446; G01C 21/3453; G01C 21/3484; G01C 21/3605; G01C 21/362; G01C 21/3626; G01C 21/3629; G01C 21/3641; G01C 21/3658; G01C 21/3667; G01C 21/3673; G01C 21/3679; G01C 21/3682; G01C 21/3697; G01C 22/00; G01C 22/02; G01C 25/005; G01C 5/06; G01C 13/006; G01C 17/00; G01C 5/00; G01P 5/165; G01P 13/025; G01P 15/08; G01P 13/00; G01P 13/02; G01P 1/023; G01P 3/488; G01P 3/52; G01P 5/02; G01P 5/14; G01P 5/16; G01P 5/26; G01P 13/045; G01P 5/12; G01P 5/20; G01P 5/06; G01P 5/07; G01P 13/006; G01P 13/0093; G01P 5/00; G01P 5/005; G01P 5/04; G01P 5/245; G01P 13/0006; G01P 13/0013; G01P 13/002; G01P 13/0066; G01P 5/001; G01P 5/10; G01P 5/24; G01P 13/0033; G01P 21/025; G01P 5/18; G01P 7/00; G01N 1/2273; G01N 1/26; G01N 29/024; G01N 15/0227; G01N 1/2208; G01N 21/53; G01N 2291/017; G01N 2291/02836; G01N 2291/02881; G01N 2291/045; G01N 2291/048; G01N 29/0672; G01N 29/262; G01N 29/46; G01N 35/00871

USPC .............................. 73/178 R, 170.01–170.15
See application file for complete search history.

(56) References Cited

U.S. PATENT DOCUMENTS

| | | | |
|---|---|---|---|
| 2004/0074294 A1* | 4/2004 | Boucher | G01C 13/008 73/187 |
| 2006/0153311 A1* | 7/2006 | Xue | H03M 13/2789 375/262 |
| 2013/0231825 A1* | 9/2013 | Chundrlik, Jr. | G01P 3/50 701/29.1 |
| 2014/0351670 A1* | 11/2014 | Gilson | H04L 1/0071 714/762 |
| 2019/0135380 A1* | 5/2019 | Calagaz | G06K 7/10297 |
| 2020/0049507 A1* | 2/2020 | Clark | G01S 7/6218 |
| 2020/0088755 A1* | 3/2020 | Borgonovo-Santos | G01P 13/0026 |

OTHER PUBLICATIONS

Consilium Sal Speed Log downloaded from http://www.consilium.se/sites/default/files/sal_log_700301a2_201301_spread.pdf, May 31, 2013 (5 pages).
Sam Electronics Dual Axis Doppler Speed Log downloaded from http://www.sam-electronics.de/products/navigation/speed-log/dual-axis-doppler-speed-log-sam-4682/ (2 pages), Oct. 19, 2018.
Fleming's right-hand rule downloaded from Wikipedia https://en.wikipedia.org/wiki/Fleming%27s_right-hand_rule, originally pre-1945 (2 pages).
DX900+ News Release by Airmar Technology Corporation dated Dec. 5, 2016 (2 pages).
DX900+ MultiLog Product Preview, METS 2016 DAME Award Submission, Sep. 21, 2016 (3 pages).
DX900+ MultiLog Sensor for Racing and Sailing Brochure by Airmar Technology Corporation, Sep. 5, 2017 (3 pages).
DX900+ MultiLog Sensor for Racing and Sailing Brochure by Airmar Technology Corporation, Nov. 11, 2016 (3 pages).

* cited by examiner

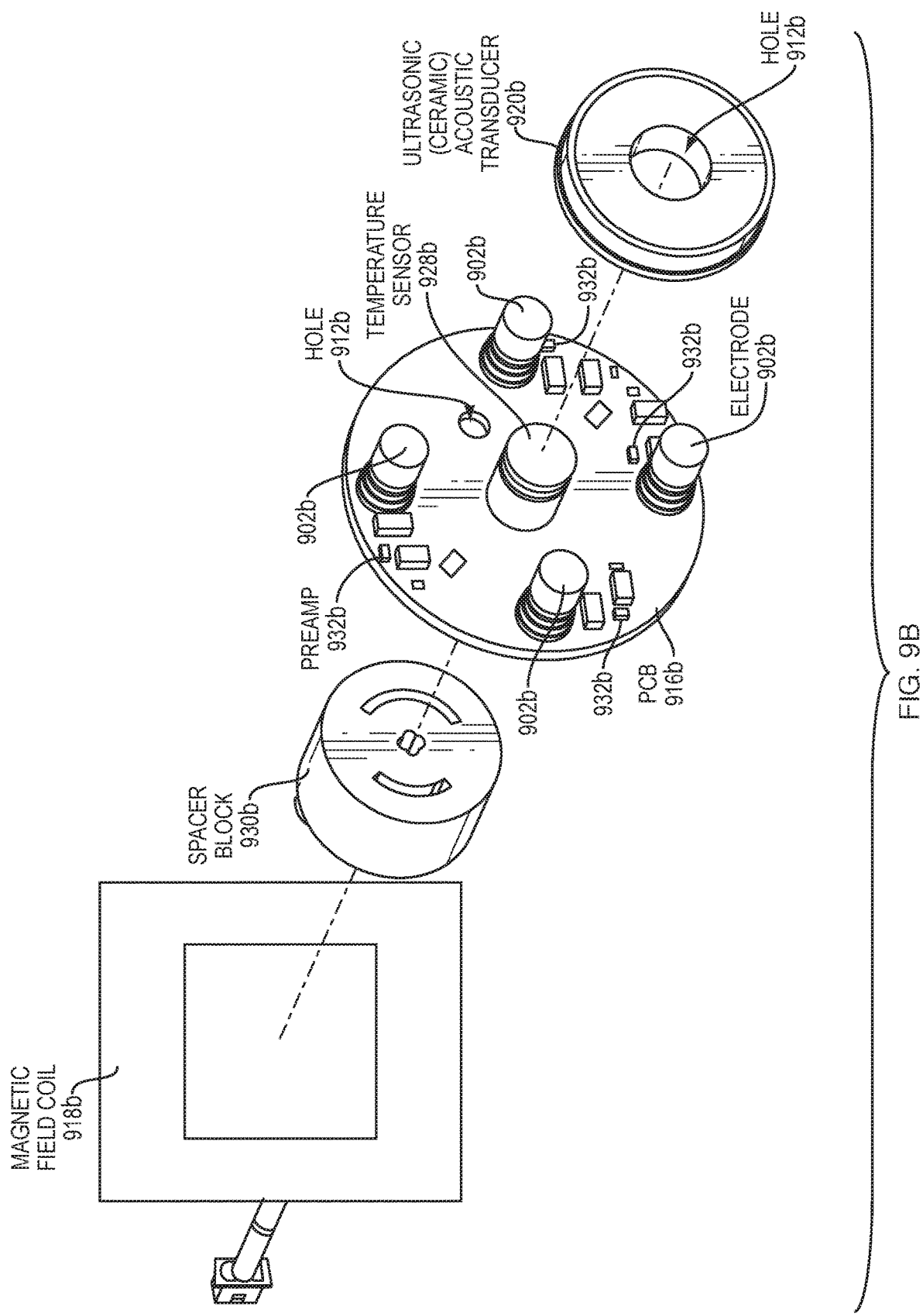

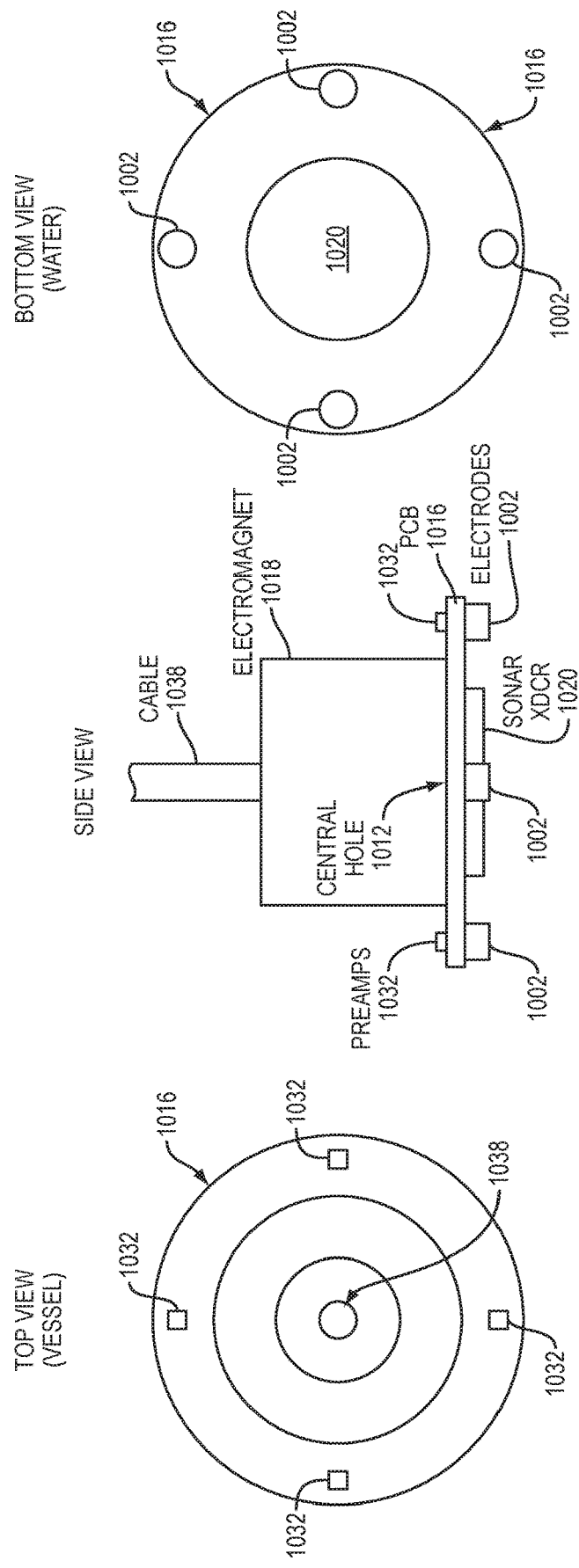

DUAL-AXIS ELECTROMAGNETIC SPEED SENSOR WITH DEPTH

RELATED APPLICATION

This application claims the benefit of U.S. Provisional Application No. 62/586,050, filed on Nov. 14, 2017. The entire teachings of the above application are incorporated herein by reference.

TECHNICAL FIELD

The following disclosure relates generally to underwater or marine measurement and has particular utility in performing multiple measurement functions using a common apparatus.

BACKGROUND

Underwater or marine acoustics technology, e.g. sonar, has been used for many years in facilitating underwater navigation, exploration, sensing and communications. In boat racing and sailing, it is useful to be able to measure both transverse speed and longitudinal speed of the vessel in real time, and without the time lag of a global positioning system (GPS). There is also a trend in the marine industry towards trying to reduce the number of holes made in the bottom of the vessel to accommodate depth and speed sensors.

SUMMARY

It has been found that by utilizing a dual-axis electromagnetic (EM) speed sensor combined with a depth transducer, a multi-function sensor system can be provided to enable various underwater or marine (fresh or salt water) measurements to be achieved in a single unit thus reducing the space required on the vessel and the cost of having such multiple functions.

Embodiments of the present disclosure are directed to systems, methods, and computer program products that operate in underwater or marine environments and perform multiple measurement functions.

In one aspect, there is provided a system for performing multiple measurement functions comprising an electromagnetic speed sensor and an acoustic depth sensor.

The electromagnetic sensor may include a coil; a dual-axis electrode subassembly positioned coaxially with the coil and having a first pair of electrodes spaced apart on a first axis and a second pair of electrodes spaced apart on a second axis at an angle (e.g., orthogonal) relative to the first axis; a driver circuit electrically coupled to the coil for driving the coil with a coil drive signal to produce an electromagnetic force vector in a direction perpendicular to a plane defined by the first and second pairs of electrodes; a data acquisition circuit electrically coupled to the dual-axis electrode subassembly and configured to acquire speed data based on a first voltage induced across the first pair of electrodes and a second voltage induced across the second pair of electrodes.

The depth sensor may include a transducer and a transceiver configured to drive the transducer with a transducer drive signal and to receive echo signals from the transducer. The system may include at least one controller configured to control the driver circuit, the data acquisition circuit and the transceiver. The at least one controller may be configured to interleave the speed data and the depth data acquired.

In yet another aspect, there is provided a method performing multiple measurement functions comprising: at an electromagnetic speed sensor having a coil and a dual-axis electrode subassembly positioned coaxially with the coil and having a first pair of electrodes spaced apart on a first axis and a second pair of electrodes spaced apart on a second axis at an angle (e.g., orthogonal) relative to the first axis, driving the coil with a coil drive signal to produce an electromagnetic force vector in a direction perpendicular to a plane defined by the first and second pairs of electrodes; acquiring speed data when the sensor is moving relative to the water, based on a first voltage induced across the first pair of electrodes and a second voltage induced across the second pair of electrodes; and at a depth sensor having a transducer and a transceiver, driving the transducer with a transducer drive signal; and receiving echo signals from the transducer to acquire depth data; controlling, by at least one controller, the driving the coil, the acquiring the speed data, and the driving the transducer; and interleaving the speed data and the depth data acquired.

In still another aspect, there is provided a computer program product comprising a non-transitory computer readable medium comprising one or more sets of computer executable instructions for implementing the method described above.

It should be understood that embodiments in the form of systems, methods, and computer program products may include elements corresponding to the multiple measurement functions. Similarly, the following example embodiments are directed to the system, but pertain similarly to the method or computer program product.

In another aspect, the electromagnetic speed sensor may include a set of preamplifiers. Each preamplifier of the set may be electrically coupled to and co-located with a corresponding electrode of the first and second pairs of electrodes. Each preamplifier may provide preamplification (local preamplification) at the corresponding electrode of the first and second voltages. The preamplification may reduce electromagnetic interference (or electric field interference, or electric interference).

In another aspect, the preamplification may be unity gain preamplification.

In another aspect, the system (or method or computer program product) may include a plurality of electromagnetic speed sensors that include the electromagnetic speed sensor. The electromagnetic speed sensors may be electrically coupled to the depth sensor. In another aspect, each electromagnetic speed sensor of the plurality operates at a same or different frequency with respect to each other of the electromagnetic speed sensors.

In another aspect, the system (or method or computer program product) may include a first housing for containing the electromagnetic speed sensor and the transducer, the first housing having a proximal end and a distal end, the proximal end configured for extending into a vessel and the distal end configured for extending into water. In another aspect, the system (or method or computer program product) may include a second housing for containing the depth sensor transceiver.

In another aspect, the dual-axis electrode subassembly may include a plate to which the four electrodes are mounted, each electrode having a wire connected thereto that is routed from the electrode towards an exit hole at the center of the plate, the exit hole coaxial with the coil to minimize offset between the first voltage and the second voltage. The plate may be circular but is not so limited to circularity. The plate may be shaped as a square, rounded, oval, rectangle, triangle, have 3 or more sides, or have any other non-circular shape.

In another aspect, the wires may be guided radially inward toward the exit hole.

In another aspect, the at least one controller may include a first controller and a second controller, wherein the second controller is a master and the first controller is a slave, the second controller controlling a command signal coupled from the second controller to the first controller, wherein if the command signal is in a first state, the depth sensor is active and the electromagnetic speed sensor is inactive and wherein if the command signal is in a second state, the depth sensor is inactive and the electromagnetic speed sensor is active. As such, using the first controller and second controller, embodiments may interleave the speed data and the depth data.

In another aspect, the second controller may toggle between the first state and the second state periodically.

In another aspect, the system (or method or computer program product) may include a temperature sensor and an inertial measurement unit (IMU). The data acquired from the inertial measurement unit (IMU) may be used to correct the speed data.

BRIEF DESCRIPTION OF THE DRAWINGS

Embodiments will now be described by way of example only with reference to the appended drawings wherein:

FIG. 9B is an exploded view of a portion of the assembly shown in FIGS. 4 and 5, according to an embodiment with a non-cylindrical coil, non-circular plate, and non-circular PCB.

FIGS. 10A-C are perspective views of a portion of the assembly shown in FIGS. 4 and 5, according to an embodiment.

DETAILED DESCRIPTION

The system described below mitigates the need for separate assemblies for performing multiple measurement functions by providing a single assembly that facilitates dual-axis speed, depth, temperature, and inertial measurement unit (IMU) measurements. IMU measurements (or IMU functions) may include but are not limited to pitch, roll, yaw, angular velocity, and linear acceleration (for heave). The IMU may include but is not limited to include an accelerometer, a rate gyro package (or gyro sensor, or gyrometer), and a Micro-Electro-Mechanical Systems (MEMS) device.

Figure 1A:
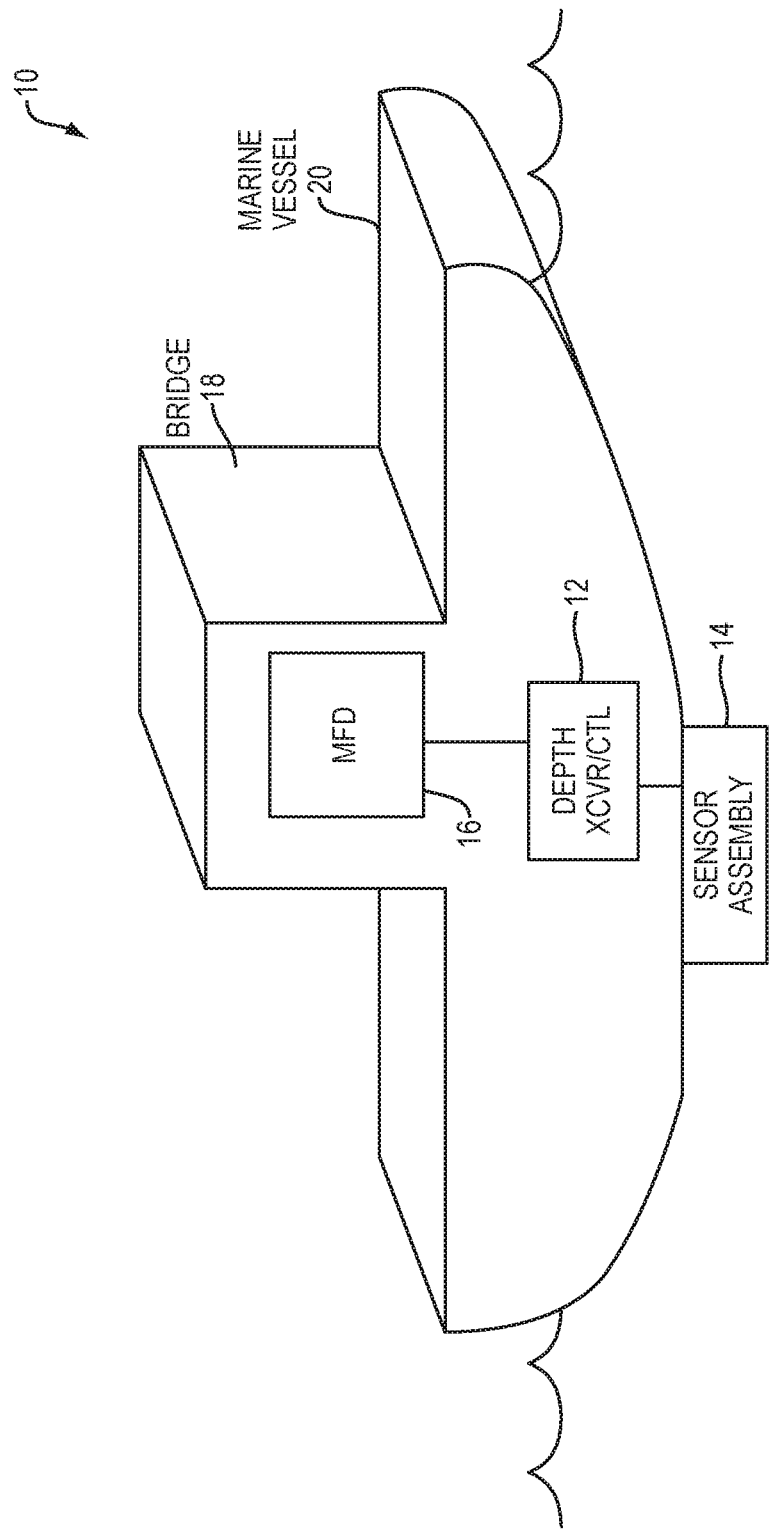
FIG. 1A is a schematic block diagram of an example multi-function sensor system shown in situ on a marine vessel with a single sensor assembly.
Figure 1B:
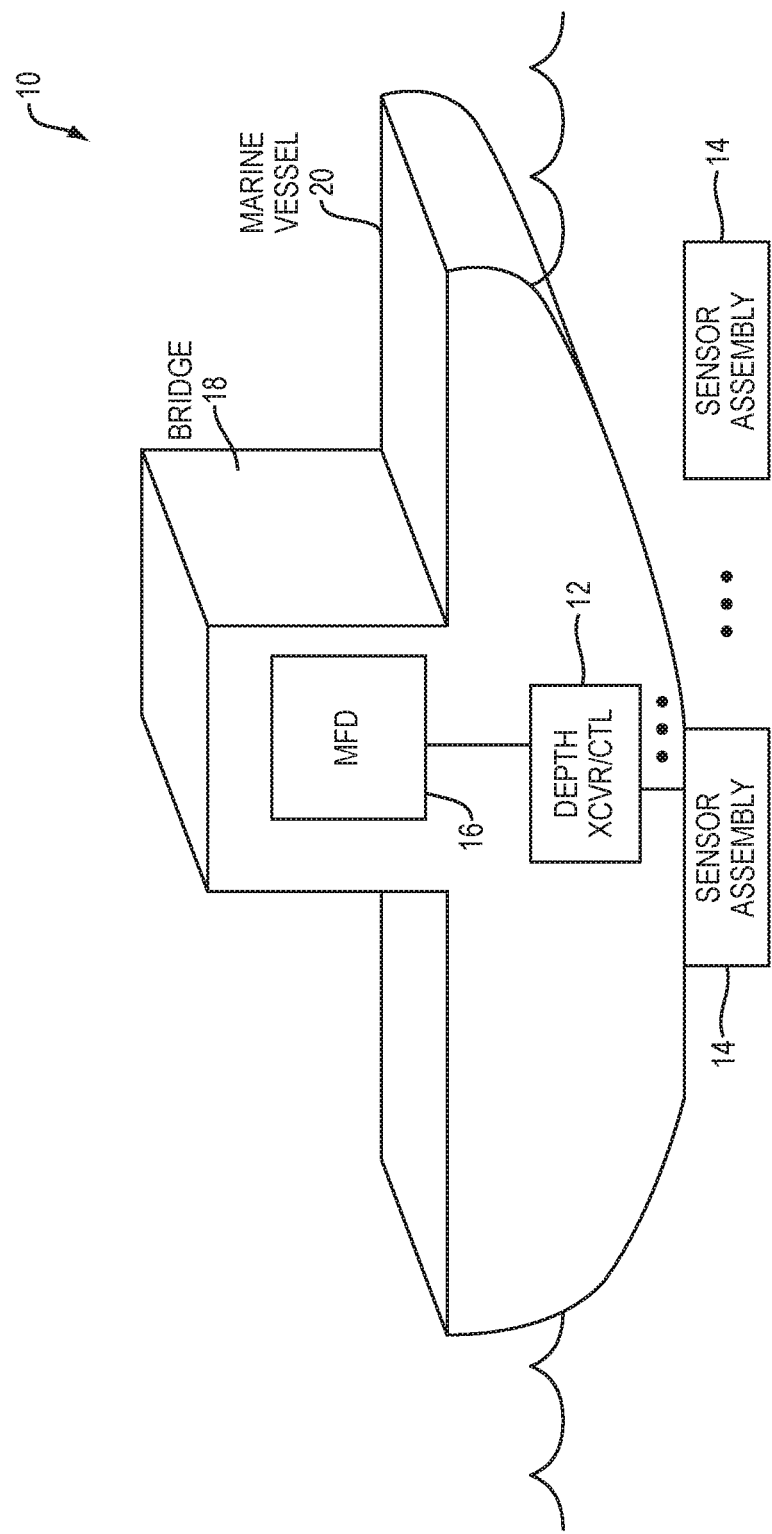
FIG. 1B is a schematic block diagram of an example multi-function sensor system shown in situ on a marine vessel with multiple sensor assemblies.

Turning now to FIGS. 1A-B, a multi-function sensor system is generally denoted by numeral 10 and will hereinafter be referred to as the "system 10." FIG. 1A is a schematic block diagram of an example multi-function sensor system 10 shown in situ on a marine vessel with a single sensor assembly 14. FIG. 1B is a schematic block diagram of an example multi-function sensor system 10 shown in situ on a marine vessel with multiple sensor assemblies 14.

The system 10 comprises a depth transceiver/control module 12 connected to one or more sensor assemblies 14. The depth transceiver/control module 12 primarily provides depth measurements. Each sensor assembly 14 provides speed, temperature and inertial measurement unit (IMU) measurements. The depth transceiver/control module 12 connects to a bridge computer combined with a graphical user interface (GUI), referred to herein as a multifunctional display (MFD) 16. The MFD 16 may be situated on the bridge 18 of a marine vessel 20, or may be in any other control room, main or auxiliary portion of the marine vessel 20. The GUI enables a user to interact with the system 10 for selecting between different functions and viewing and analyzing data. In this example, the one or more sensor assemblies 14 are slaved to the depth transceiver/control module 12, which may communicate information to a user on the bridge 18 (or elsewhere) by a networked connection to the MFD 16.

The MFD 16 may also include an auxiliary input such as a Bluetooth®, USB or other communication link to enable configuration updates to be uploaded to the system 10, e.g. for reconfiguring a function or to remotely and/or automatically instruct the system 10 to switch between different functions. The updates can also be used to perform firmware upgrades, sync data, download data or perform any other data transfer task required by the application.

It will be appreciated that the system 10 in some embodiments can operate autonomously or remotely, i.e., without the MFD 16 or via a remote bridge computer (not shown)

and thus the updates and any other communications can instead be provided directly to the system 10.

As can be appreciated, the system 10 includes various hardware components that can be configured to perform various functions using firmware that either resides in the system 10 upon initial programming, or is downloaded at a later time, e.g. to upgrade the system 10 to utilize additional functions.

As illustrated in FIG. 1B, in an embodiment, the system 10 (or method or computer program product) may include a plurality of electromagnetic speed sensors (included in each of sensor assemblies 14). The electromagnetic speed sensors may be electrically coupled to the depth sensor of the depth transceiver/control module 12. In another aspect, each electromagnetic speed sensor of the plurality operates at a same or different frequency with respect to each other of the electromagnetic speed sensors.

Figure 1C:
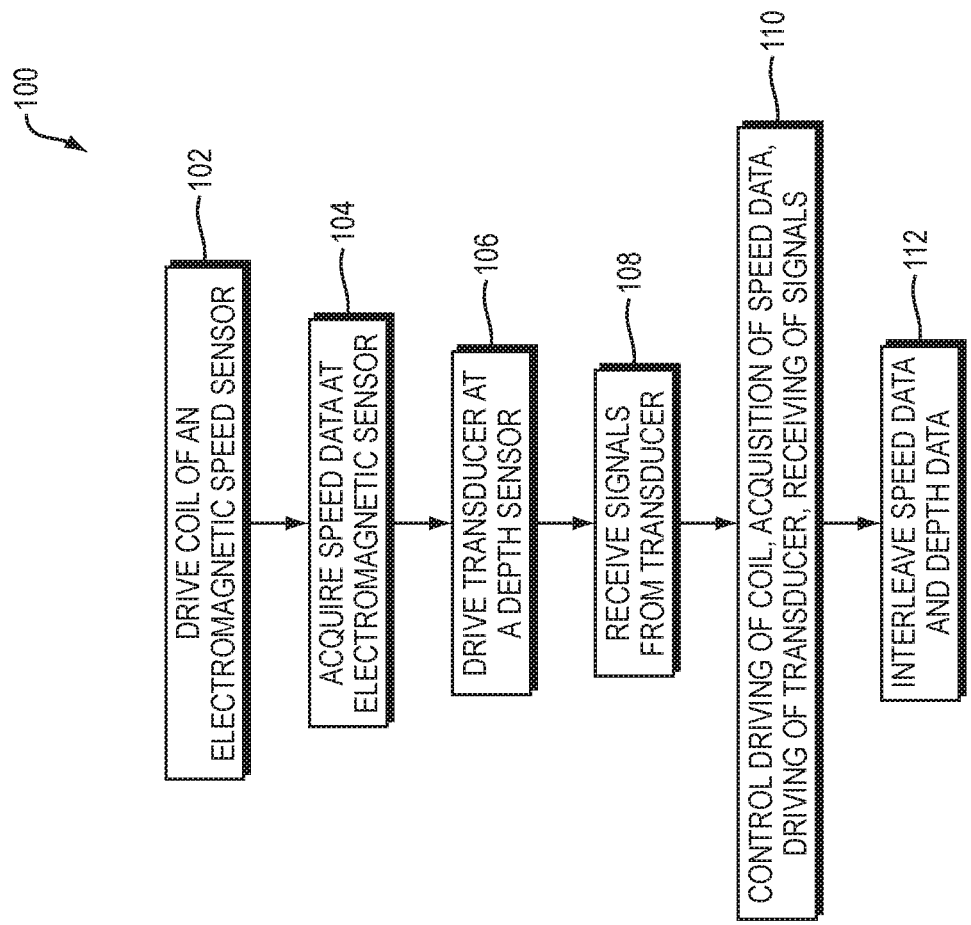
FIG. 1C is a flow diagram illustrating an example method (or system), according to some embodiments of the present disclosure.

FIG. 1C is a flow diagram illustrating an example method 100 (or system), according to some embodiments of the present disclosure. As illustrated in FIG. 1C, in some embodiments, the methods 100 (and systems and computer program products) may perform multiple measurement functions including at an electromagnetic speed sensor having a coil and a dual-axis electrode subassembly positioned coaxially with the coil and having a first pair of electrodes spaced apart on a first axis and a second pair of electrodes spaced apart on a second axis at an angle (e.g., orthogonal) relative to the first axis. The methods 100 (and systems and computer program products) may drive the coil with a coil drive signal to produce an electromagnetic force vector in a direction perpendicular to a plane defined by the first and second pairs of electrodes (102). The methods 100 (and systems and computer program products) may acquire speed data when the sensor is moving relative to the water, based on a first voltage induced across the first pair of electrodes and a second voltage induced across the second pair of electrodes (104). At a depth sensor having a transducer and a transceiver, the methods 100 (and systems and computer program products) may drive the transducer with a transducer drive signal (106). The methods 100 (and systems and computer program products) may receive echo signals from the transducer to acquire depth data (108). The methods 100 (and systems and computer program products) may control, by at least one controller, the driving the coil, the acquiring the speed data, and the driving the transducer (110). The controller may interleave the speed data and the depth data (112).

In another aspect, the electromagnetic speed sensor may include a set of preamplifiers. Each preamplifier of the set may be electrically coupled to and co-located with a corresponding electrode of the first and second pairs of electrodes. Each preamplifier may provide preamplification (local preamplification) at the corresponding electrode of at least one of the first and second voltages. The preamplification may reduce electromagnetic interference (or electric field interference, or electric interference).

In another aspect, the preamplification may be unity gain preamplification.

In another aspect, the method 100 (or system or computer program product) may include a plurality of electromagnetic speed sensors that includes the electromagnetic speed sensor. The electromagnetic speed sensors may be electrically coupled to the depth sensor.

In another aspect, each electromagnetic speed sensor of the plurality operates at a same or different frequency with respect to each other of the electromagnetic speed sensors of the plurality.

In another aspect, the method 100 (or system or computer program product) may include a first housing for containing the electromagnetic speed sensor and the transducer, the first housing having a proximal end and a distal end, the proximal end configured for extending into a vessel and the distal end configured for extending into water. In another aspect, the method 100 (or system or computer program product) may include a second housing for containing the depth sensor transceiver.

In another aspect of the method 100 (or system or computer program product) the dual-axis electrode subassembly may include a plate to which the four electrodes are mounted, each electrode having a wire connected thereto that is routed from the electrode towards an exit hole at the center of the plate, the exit hole coaxial with the coil to minimize offset between the first voltage and the second voltage. The plate may be circular but is not so limited to circularity.

In another aspect of the method 100 (or system or computer program product), the wires may be guided radially inward toward the exit hole.

In another aspect of the method 100 (or system or computer program product), the at least one controller may include a first controller and a second controller, wherein the second controller is a master and the first controller is a slave, the second controller controlling a command signal coupled from the second controller to the first controller, wherein if the command signal is in a first state, the depth sensor is active and the electromagnetic speed sensor is inactive and wherein if the command signal is in a second state, the depth sensor is inactive and the electromagnetic speed sensor is active.

In another aspect of the method 100 (or system or computer program product), the second controller may toggle between the first state and the second state periodically.

In another aspect, the method 100 (or system or computer program product) may include a temperature sensor and an inertial measurement unit (IMU). The data acquired from the inertial measurement unit (IMU) may be used to correct the speed data.

Figure 2:
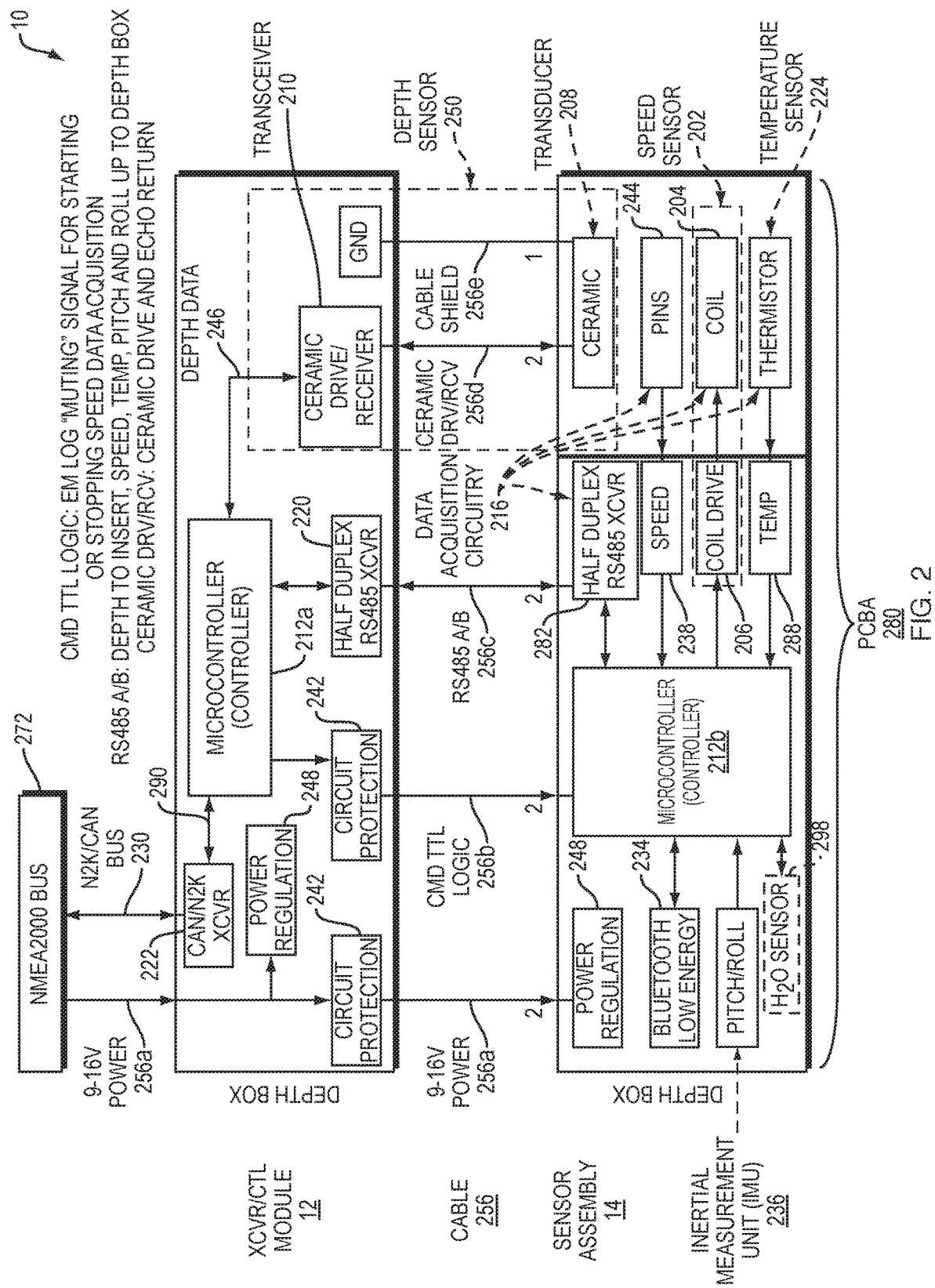
FIG. 2 is a schematic block diagram showing further detail of the system shown in FIG. 1.

FIG. 2 is a schematic block diagram showing further detail of the system 10 shown in FIG. 1. In one aspect, there is provided a system 10 for performing multiple measurement functions comprising an electromagnetic speed sensor 202 and an acoustic depth sensor 250.

The electromagnetic speed sensor 202 may include a coil 204; a dual-axis electrode subassembly 14 (sensor assembly) positioned coaxially with the coil 204 and having a first pair of electrodes spaced apart on a first axis and a second pair of electrodes spaced apart on a second axis at an angle (e.g., orthogonal) relative to the first axis; a driver circuit 206 (Coil Drive) electrically coupled to the coil 204 for driving the coil 204 with a coil drive signal to produce an electromagnetic force vector in a direction perpendicular to a plane defined by the first and second pairs of electrodes and a data acquisition circuit 216 electrically coupled to the dual-axis electrode subassembly 14 (sensor assembly) and configured to acquire speed data 238 based on a first voltage induced across the first pair of electrodes and a second voltage induced across the second pair of electrodes.

The depth sensor 250 may include a transducer 208 and a transceiver 210 configured to drive the transducer 208 with a transducer drive signal and to receive echo signals from the transducer 208. The system 10 may include at least one controller (212a, 212b, collectively) configured to control the driver circuit 206, the data acquisition circuit 216 and the transceiver 210. The at least one controller (212a, 212b, collectively) may be configured to interleave the speed data 238 and the depth data 246 acquired.

The depth transceiver/control module 12 includes a piezoceramic drive/receiver (also referred to as an echosounder transceiver) 210, a half-duplex RS485 transceiver 220 and a CAN/N2K transceiver 222 under control of a microcontroller 212a. The depth transceiver/control module microcontroller 212a also controls command TTL logic for starting and stopping speed data 238 acquisition by the sensor assembly 14.

The receiver circuitry for the piezoceramic driver/receiver 210 may include a transmit/receive (T/R) switch, a tuned band pass preamplifier and a logarithmic envelope detector and an Analog-to-Digital Converter (ADC) (e.g., for chirp). The receive circuitry for the piezoceramic driver/receiver 210 may include a T/R switch, a tuned band pass preamp, and an ADC so that phase is preserved for wideband correlation processing (e.g., for chirp) by the microprocessor 212a. The drive circuitry for the piezoceramic driver/receiver 210 may include a switch mode power amplifier capable of delivering ~80 watts of pulsed electrical power as a narrow or wideband waveform to the piezoceramic transducer 208. The depth transceiver/control module 12 may be configured to measure water depth (element 246 of FIG. 2) up to 60 meters using e.g., a 360 kHz ceramic transducer, or to greater water depths with additional input power or increased transmit bandwidth or both.

The sensor assembly 14 comprises a printed circuit board assembly (PCBA) 280 and sensor elements including a piezoceramic transducer 208, a coil 204, electrode pins 244 and a thermistor 224 (temperature sensor). The PCBA 280 includes a half-duplex RS485 transceiver 282, speed acquisition circuitry 216, coil drive circuitry 206, temperature acquisition circuitry 224, inertial measurement unit (IMU) circuitry 236, a Bluetooth® low energy transceiver 234 under control of a microcontroller 212b, and power regulation circuitry 248. The sensor assembly microcontroller 212b is controlled by the depth transceiver/control module microcontroller 212a through the command TTL logic 256b for starting and stopping acquisition of speed data 238. A cable 256 connects the depth transceiver/control module 12 to the sensor assembly 14, with cable pairs for power 256a, ground (GND) 256e, CMD TTL logic 256b, half-duplex RS485 communications 256c, and piezoceramic transducer transmit/receive 256d.

The microcontrollers (212a, 212b) may be, for example, an ARM processor, augmented with EEPROM for program storage. The depth transceiver/control module microcontroller 212a may be configured to execute an algorithm for measuring depth 246 (TX signal generation, RX signal detection, and range gating).

As shown in FIG. 2, in the NMEA 2000 (N2K) communication standard across the NMEA2000 bus 272, messages 230 are sent to the CAN transceiver 222 and received from the CAN transceiver 222 as packets that include a header followed by (typically) 8 bytes of data. The header for a message 230 specifies the transmitting device, the device to which the message was sent (which may be all devices), the message priority, and the PGN (Parameter Group Number). The PGN indicates which message is being sent, and thus how the data bytes should be interpreted to determine the values of the data fields that the message contains.

In an embodiment, the NMEA 0183 communication standard, the predecessor to NMEA 2000, uses a simple ASCII, serial communications protocol that defines how data are transmitted in a "sentence" from one "talker" to multiple "listeners" at a time.

In an embodiment, the depth microcontroller 212a may be configured to generate NMEA 2000 (N2K) PGN messages 230 to report depth 246 to ship board data systems (such the MFD 16 of FIGS. 1A-B, not shown in FIG. 2 but located above and connected to NMEA Bus 272 of FIG. 2), and may be configured to receive NMEA 0183 Sentences 290 from the sensor assembly microcontroller 212b, and convert the Sentences 290 to N2K PGN messages 230 to report water speed 238 and temperature 288 to ship board data systems (such the MFD 16 of FIGS. 1A-B, not shown in FIG. 2 but located above and connected to NMEA Bus 272).

The inertial measurement unit (IMU) circuitry 236 may include a three-axis MEMS accelerometer or may include a full multi axis IMU. The inertial measurement unit (IMU) 236 information sensed may be used to correct speed 238.

The power supply circuits include circuit protection 242 for circuitry, and regulators 248 to generate voltages needed for on board analog and logic circuitry. Regulator circuitry 248 may include filters to reduce the levels of electrical noise present on ship board alternating current (AC) and/or direct current (DC) power mains.

In an embodiment, as illustrated in FIG. 2, an additional, but optional, sensor and observation control circuit 298 or software measures the electrical conductivity of the water. This allows the option for a variable gain for the preamps that can adjust for changes in water salinity. For example, in fresh water the EM sensor has a lower sensitivity while in salt water the sensitivity increases. Lower sensitivity might require a change in the noise filtering for each FORE/AFT or PORT/STARBOARD, while this filtering might be alleviated in more saline conditions. Less filtering is usually preferred in any measurement system if it can be avoided because filtering often adds lag or time delay to the speed estimate that the EM speed log provides. Some embodiments employ a combined filtering method that reduces or avoids the lag using one or more filtering techniques known to one skilled in the art, such as Kalman filtering the EM Speed log data together with the IMU sensor velocity data.

Figure 3:
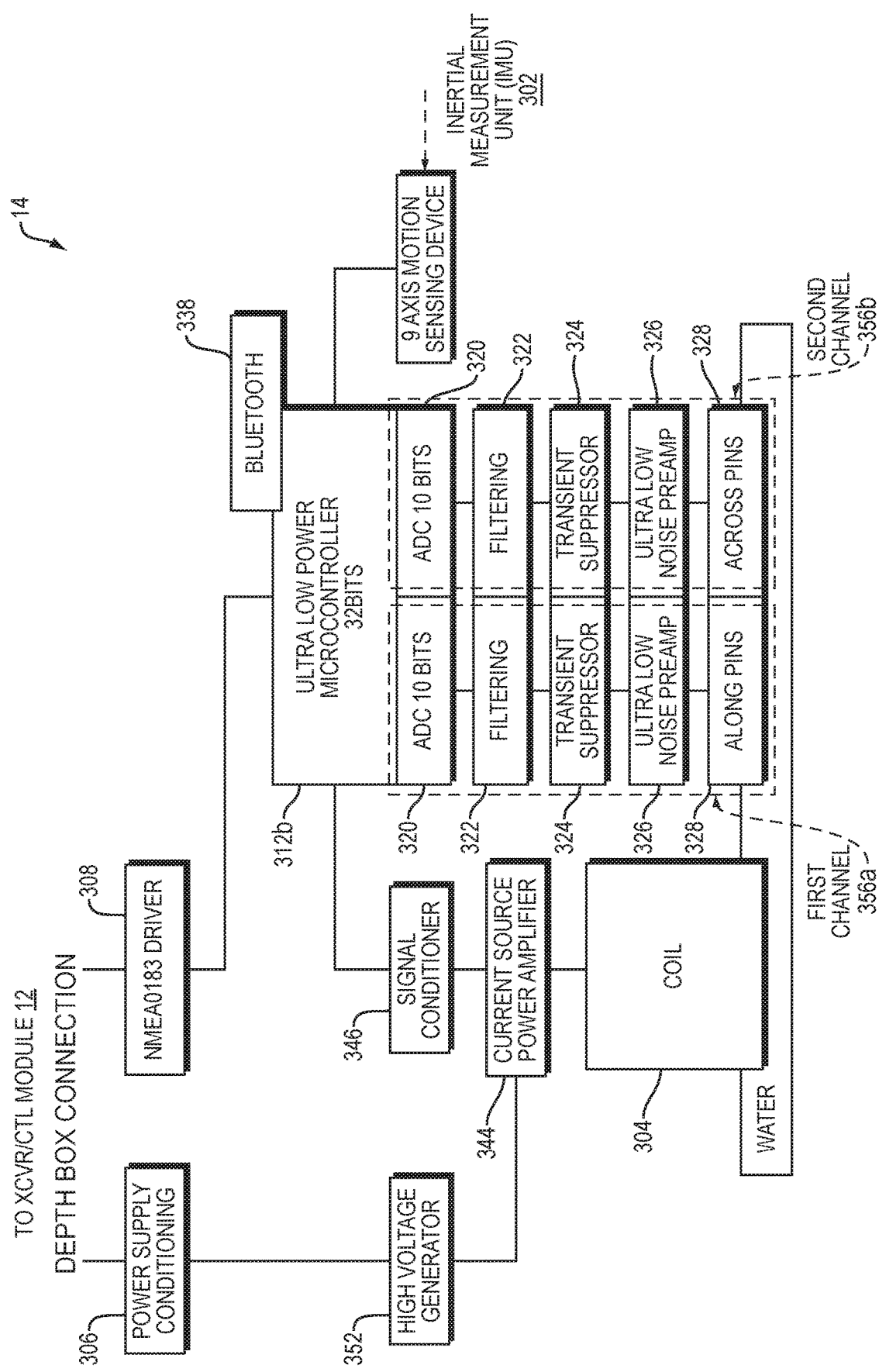
FIG. 3 is a schematic block diagram of an electromagnetic speed sensor of the system of FIG. 2.

FIG. 3 is a schematic block diagram illustrating further details of an embodiment of the electromagnetic speed sensor portion 202 of the sensor assembly 14 of FIG. 2 to communicate with the depth transceiver/control module 12 of FIG. 2. As shown in FIG. 3, in an embodiment, the sensor assembly microcontroller 312b controls signals that drive the coil 304 through a signal conditioner 346 and current source power amplifier 344. The microcontroller 312b may be driven by the NMEA0183 driver 308.

A high voltage generator 352 supplies a high voltage to the current source power amplifier 344 through the power supply conditioning circuit 306. The sensor assembly microcontroller 312b acquires speed data through two channels (356a, 356b), a first channel 356a dedicated to longitudinal ("fore and aft") speed via "along" pins 328 and a second channel 356b dedicated to transverse ("port to starboard") speed via "across" pins 328. Each channel (first channel 356a, second channel 356b) includes an ultra-low noise preamp 326, transient suppressor 324, filtering 322 and analog-to-digital converter (ADC) 320. As illustrated in FIG. 3, data (including but not limited to speed data or depth data) from an Inertial Measurement Unit (IMU) 302 or wireless device (through Bluetooth circuitry 338) may be provided to the microcontroller 312b.

In an embodiment, each electromagnetic (EM) sensor channel (e.g. fore-aft) switches polarity from positive direct current (DC) to negative DC and so forth, typically as a periodic waveform, such as a square wave, sine wave, or any periodic waveform known to one skilled in the art. In an embodiment, a square wave is employed as the periodic waveform due to advantages of circuitry implementation or improved noise rejection or amplitude. It is appreciated that this alternation of polarity eliminates errors due to DC offsets in the signal path.

In an embodiment, the switching frequency and the corresponding integer harmonics of the switching frequency are preferably different than the frequency of the alternating current (AC) main electrical supply used on the vessel, so that the EMI from the mains do not interfere with the deliberate EM sensor. In an embodiment, a 100 Hz switching frequency may be used in a North American sailboat that uses an on-board 60 Hz AC power grid, but may not be preferred for use in a European boat that employs a 50 Hz AC grid, because 100 Hz is the first even harmonic of 50 Hz.

In another embodiment, a variable frequency may be used so as to avoid errors due to interference at any constant power supply frequency.

Figure 4:
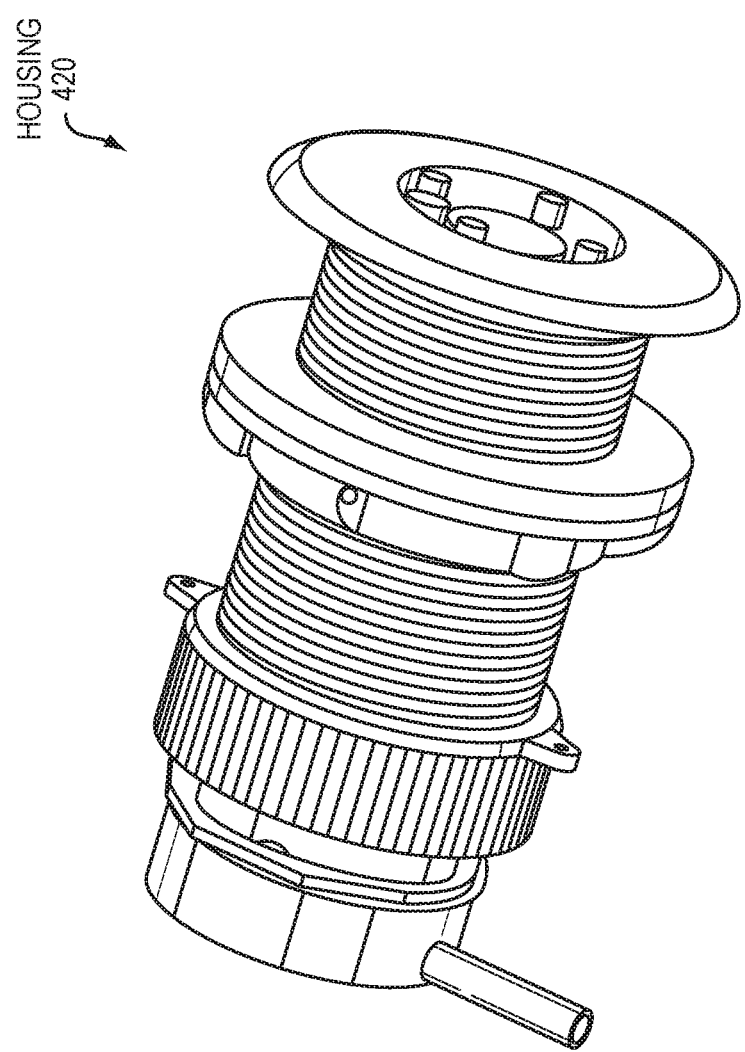
FIG. 4 is a block diagram showing an example physical layout for implementing the sensor assembly shown in FIGS. 2 and 3.

FIG. 4 is a block diagram showing an example physical layout of an assembly for implementing the electromagnetic speed sensor shown in FIGS. 2 and 3. The assembly includes a housing 420 such as a P717V or P617V model housing available from AIRMAR TECHNOLOGY CORPORATION. The housing is designed to fit through a single opening in a hull of the marine vessel.

Figure 5:
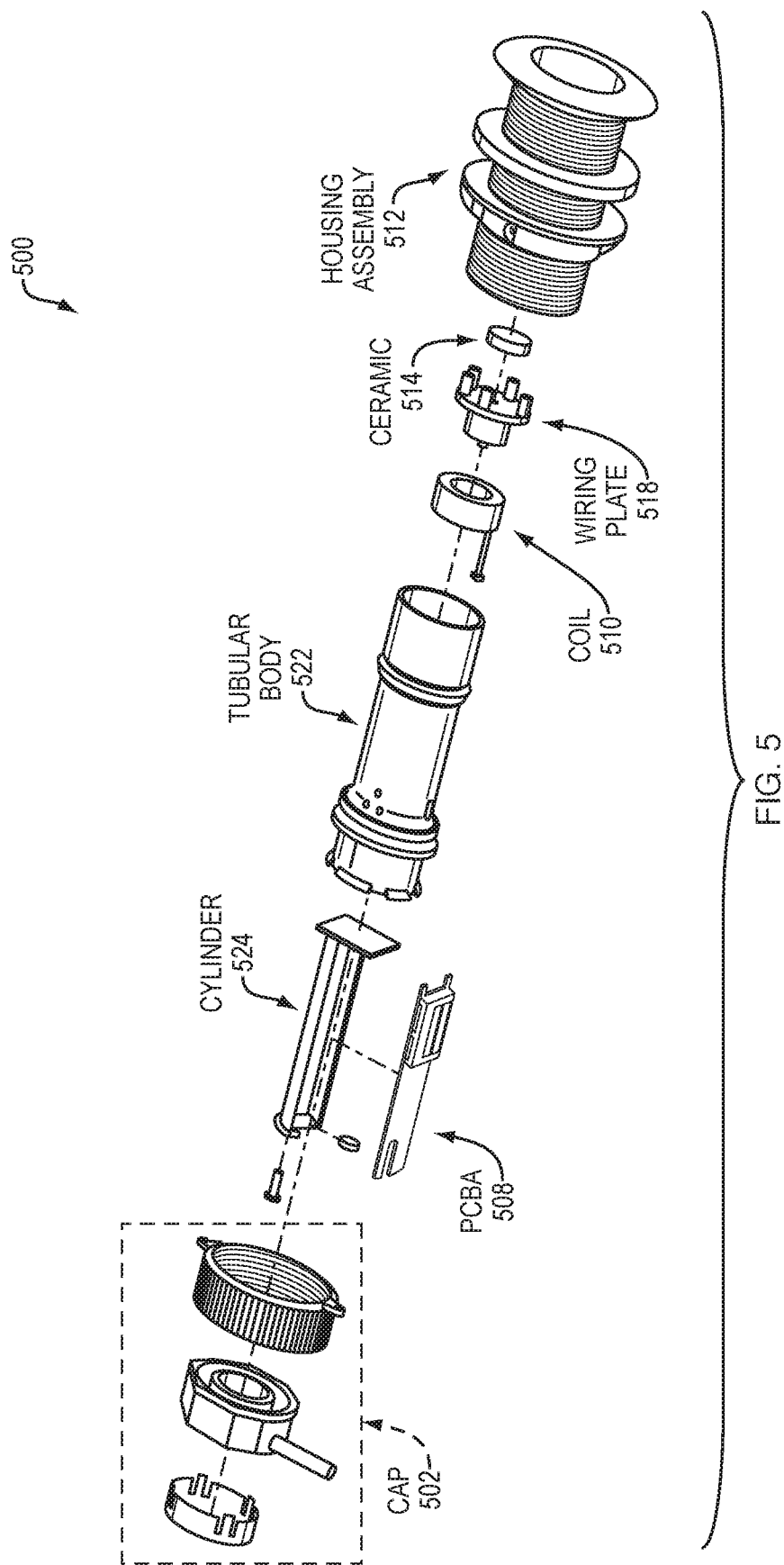
FIG. 5 is an exploded view of the assembly shown in FIG. 4.

FIG. 5 is an exploded view of the assembly shown in FIG. 4. The exploded view illustrates the disassembled housing 500 which includes a cap 502, a tubular body 522 and a threaded cylinder 524, the PCBA 508, coil 510, electrode subassembly 512, piezoceramic transducer 514, and wiring plate 518. When assembled, the PCBA 508, coil 510, electrode subassembly 512 and piezoceramic transducer 514 are positioned in the tubular body 522 which itself slides into the threaded cylinder 524.

Figure 6:
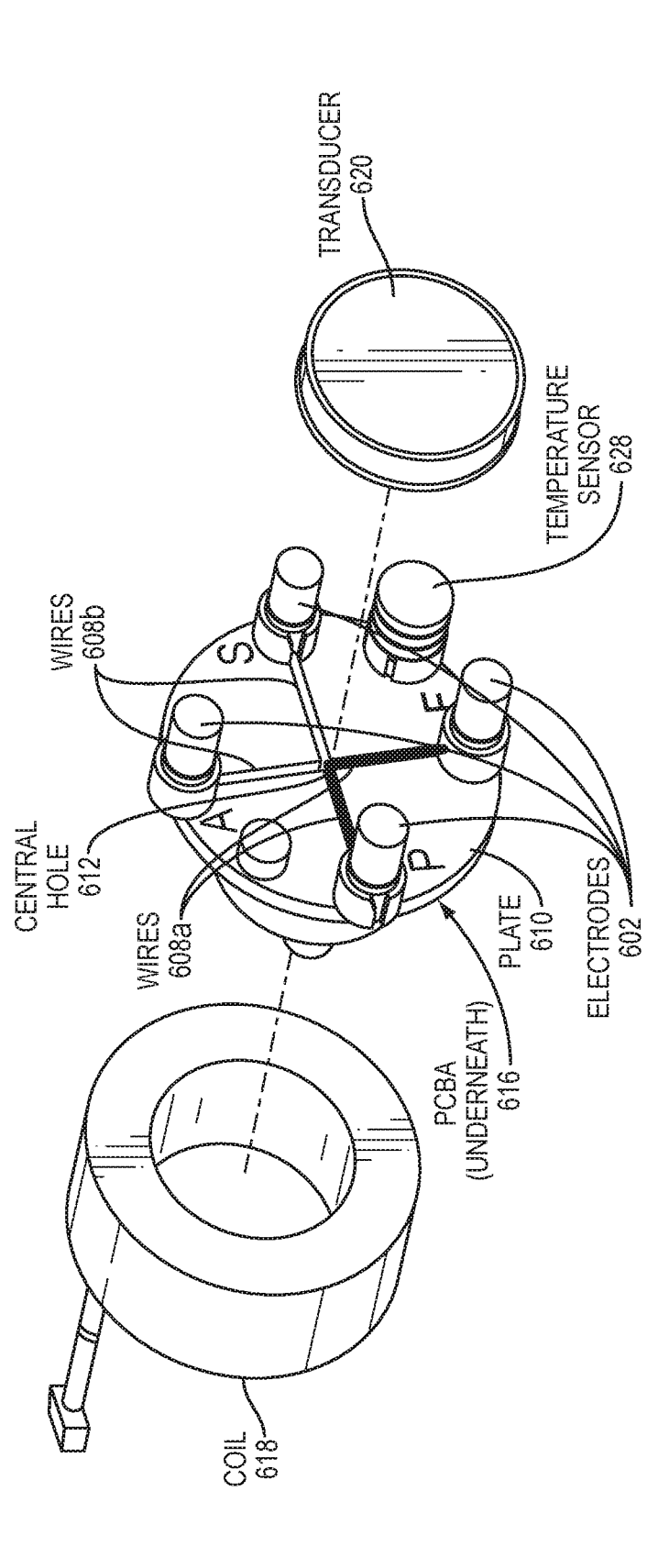
FIG. 6 is an exploded view of a portion of the assembly shown in FIGS. 4 and 5, according to an embodiment.

FIG. 6 is an exploded view of a portion of the assembly shown in FIGS. 4 and 5. This view illustrates the cross configuration of the electrodes. The electrodes 602 include four contacts 602 that are connected to the PCBA 616 (underneath) via wires 608a, 608b recessed into channels on a plate 610. As illustrated, in order to reduce magnetic flux (including but not limited to including electromagnetic interference or electric interference), the wires 608a, 608b are recessed orthogonally into two separate channels (for wires 608a, 608b, respectively), and the wires 608a, 608b are as short as possible. The use of four electrodes 602 (in positions of aft, port, starboard, forward, respectively) is particularly advantageous because it allows minimization (reduction) of wiring and orthogonal wires 608a, 608b.

As illustrated in FIG. 6, in an embodiment, the plate 610 is circular, but is not so limited, and in embodiments, the shape of the plate 610 may be square, rounded, oval, rectangle, triangular, have 3 or more sides, or any other non-circular shape. The wires (608a, 608b) form a cross configuration along two orthogonal axes and exit through a central hole 612 to connect to the PCBA 616. It should be understood that in other embodiments the axes can be at other angles that are not orthogonal, and that the pin spacing for fore-aft may be different than port-starboard.

The coil 618 has copper foil wrapped around it to provide shielding to reduce electromagnetic interference. A solid iron disk (not shown) may be positioned behind the coil 618 shield to concentrate the magnetic field. The disk may also be replaced with a more expensive disk-like iron structure that has features to more optimally concentrate the magnetic field between each sensor pair. The plate 610 (which may be circular but is not so limited) is configured to receive the piezoceramic transducer such that the coil 618, plate 610 and piezoceramic transducer 620 are coaxial.

In other embodiments, the piezoceramic transducer 620 may have a bar shape and may be offset from the center 612 rather than being coaxially positioned with respect to the coil 618 and plate 610.

In an embodiment, the circular plate includes a temperature sensor 628 offset from the central hole 612.

In an embodiment, the electrode wire position uses grooves in a holder to position the wires 608a, 608b. In an embodiment, the wiring arrangement is replaced by a printed circuit board 616 featuring etched traces on the board from the pins, through the coil 618 to the measuring circuit.

The sensor pins, preferably but not limited to, circular face areas are mounted such that the face is flush, or nearly flush, with the exterior surface of the inert waterproofing (e.g. epoxy). This reduces or eliminate the possibility of hydrodynamic turbulence past the pins, and allows fairly smooth water flow over the acoustic depth sensor. This reduces the acoustic noise caused by the pins on the acoustic depth measurement. The inert waterproofing therefore serves as a water barrier, and if chosen well, can also act as an acoustic impedance matching layer.

An Electromagnetic Log, also referred to as an EM Log, may measure speed of a vessel through water. However, there are problems with EM Log design in existing approaches. With time, the electrode surfaces of the EM Log can corrode due to contact with sea water. A very high corrosion resistant material may be used for the pins, such a nickel-molybdenum-chromium super-alloy with an addition of tungsten designed to have excellent corrosion resistance in a wide range of severe environments, or other suitable material.

The signals generated by fluid flow in a magnetic field are low in amplitude, on the order of microvolts, and generated at high impedance, on the order of hundreds of kilo-ohms. These low levels invite electromagnetic interference of various sorts. In particular, the close proximity between the magnetic field coil and the pickup electrodes creates a potential for both electric field interference, due to the high voltages needed to excite the coil, and magnetic field interference, if the wiring to the electrodes includes open loops that can act as magnetic field antennae. Interference from the magnet coil's drive is particularly pernicious in that it is matched in frequency to the expected voltage signal generated by fluid flow.

Another problem seen in the EM Log design involves the difficulty in making reliable connections to the electrodes. The electrodes have to be made from corrosion resistant alloys (Hastelloy, Monel, or similar) in order to assure long life. These alloys are very difficult to solder to, and generally are connected via threaded inserts, which then must be soldered to the cables connecting the electrodes to the EM Log's preamplifier circuits.

In order to address these problems, embodiments shown at least in FIGS. 7-10 advantageously employ a printed wiring board (PCB) to make connections to the electrodes and place preamps close to the electrodes, as described herein. As such, electric field interference is reduced by placing electrodes close to the preamps. FIGS. 7-10 to follow also depict an implementation including a SONAR XDCR for depth sounding. FIGS. 7-10 also illustrate a temperature sensor (728, 828, 928a, 928b, respectively), which can be added to the EM Log to measure water temperature through contact with water directly (as in FIGS. 7, 9A) or through a ceramic hole (as in FIGS. 8, 9B).

In an embodiment, the systems shown in FIGS. 7-10 may optionally include one or more holes (712, 812, 912a, 912b, respectively) in their PCBs (716, 816, 916a, 916b, respectively) or transducers (720, 820, 920a, 920, respectively). One or more of the holes (812, 912b, respectively) may enable the temperature sensor to contact water.

Figure 7:
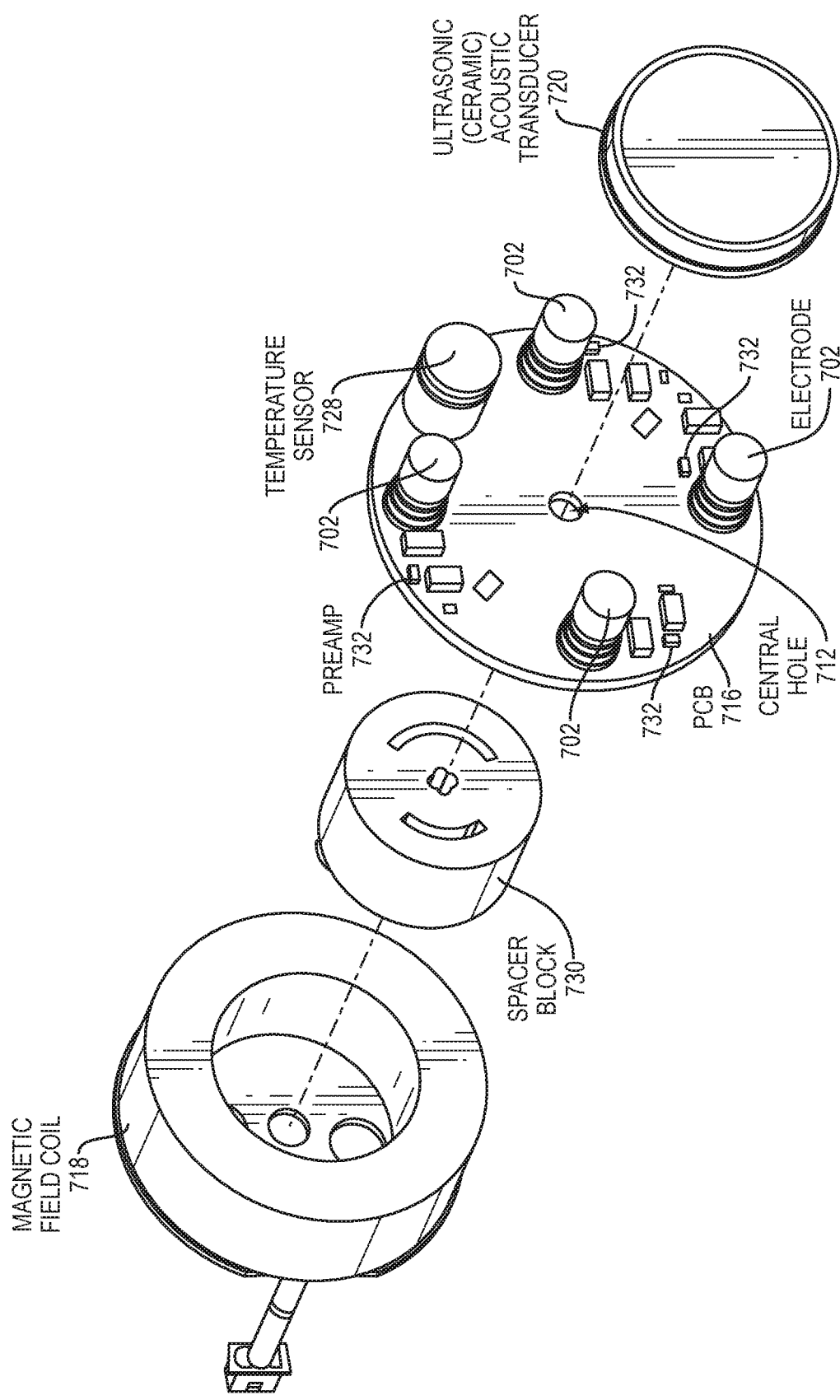
FIG. 7 is an exploded view of a portion of the assembly shown in FIGS. 4 and 5, according to an embodiment with a temperature sensor being offset with respect to the center of the PCB.

FIG. 7 is an exploded view of a portion of the assembly shown in FIGS. 4 and 5, according to an embodiment. Like in FIG. 6, FIG. 7 illustrates a magnetic field coil 718, spacer block 730, temperature sensor 728, preamps 732, PCB 716, a central hole 712 in the PCB, electrodes 702, and transducer 720. In an embodiment, shown in FIG. 7, the temperature sensor 728 is offset with respect to the PCB 716.

The electromagnetic sensor of FIG. 7 may include a coil 718; a dual-axis electrode subassembly positioned coaxially with the coil 718 and having a first pair of electrodes 702 spaced apart on a first axis and a second pair of electrodes 702 spaced apart on a second axis at an angle (e.g., orthogonal) relative to the first axis; a driver circuit electrically coupled to the coil 718 for driving the coil with a coil drive signal to produce an electromagnetic force vector in a direction perpendicular to a plane defined by the first and second pairs of electrodes; a data acquisition circuit electrically coupled to the dual-axis electrode subassembly and configured to acquire speed data based on a first voltage induced across the first pair of electrodes 702 and a second voltage induced across the second pair of electrodes 702. The coil 718 may be driven so as to produce a magnetic field of alternating polarity, and the measuring circuitry designed so as to detect an AC signal, so as to eliminate the errors in measurement that might otherwise be caused by any DC offsets in the received signal, such as those produced by electro-chemical activity in the electrodes, DC offsets in the receive circuitry electronic components, etc.

In addition to providing for connections to the electrodes 702, typically by the use of surface mount threaded bosses installed on the PCB 716 during pick and place assembly, the PCB 716 can supply additional valuable functions including but not limited to: (1) consistent signal routing using PCB layout and copper deposition within very tight repeatable manufacturing tolerances; (2) modern PCB fabrication methods produce that highly repeatable assemblies with very tight dimensional tolerances; (3) signal shielding by use of conductive planes in the PCB "stack;" (4) local preamplification at the electrode connection; (5) straightforward cable connections; (6) reduced assembly labor; and (7) automated part placement.

The preamplifiers 732 are preferably implemented as "unity gain" types, as the gain of an op amp preamp 732 can be set more accurately at unity than at any other gain level. This degree of precision greatly improves the ability of subsequent preamplifier stage to remove the effects of common mode noise. The close proximity of these local preamps to the electrodes 702 greatly reduces the potential for local electromagnetic interference; the preamps' very low output impedance (typically less than an ohm) virtually eliminates the potential for electromagnetic interference in the interconnecting cable.

Figure 8:
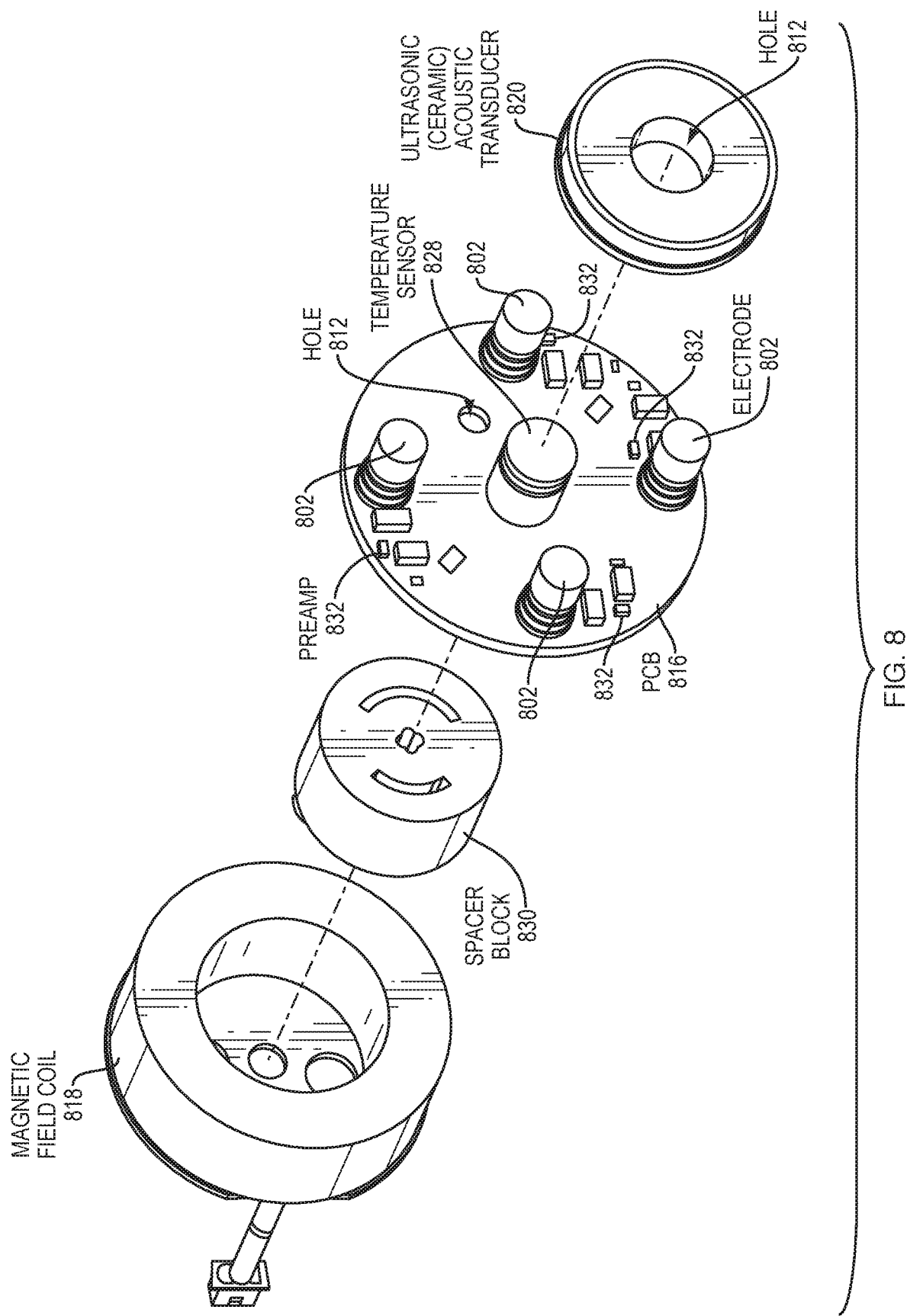
FIG. 8 is an exploded view of a portion of the assembly shown in FIGS. 4 and 5, according to an embodiment with a temperature sensor located in the center of the PCB.

FIG. 8 is an exploded view of a portion of the assembly shown in FIGS. 4 and 5, according to an embodiment. Like in FIG. 6, FIG. 8 illustrates a magnetic field coil 818, spacer block 830, temperature sensor 828, preamps 832, PCB 816, an optional hole 812 in the PCB, electrodes 802, and transducer 820. In FIG. 8, in an embodiment, the temperature sensor 828 is in a central location on the PCB 816. As such, FIG. 8 illustrates an embodiment in which the temperature sensor is on a center axis and piezoceramic has a hole 812. The embodiment in FIG. 8 allows more flexibility in type of piezoceramic as well as having symmetric placement of the temperature sensor which can remove distortion of EM.

Figure 9A:
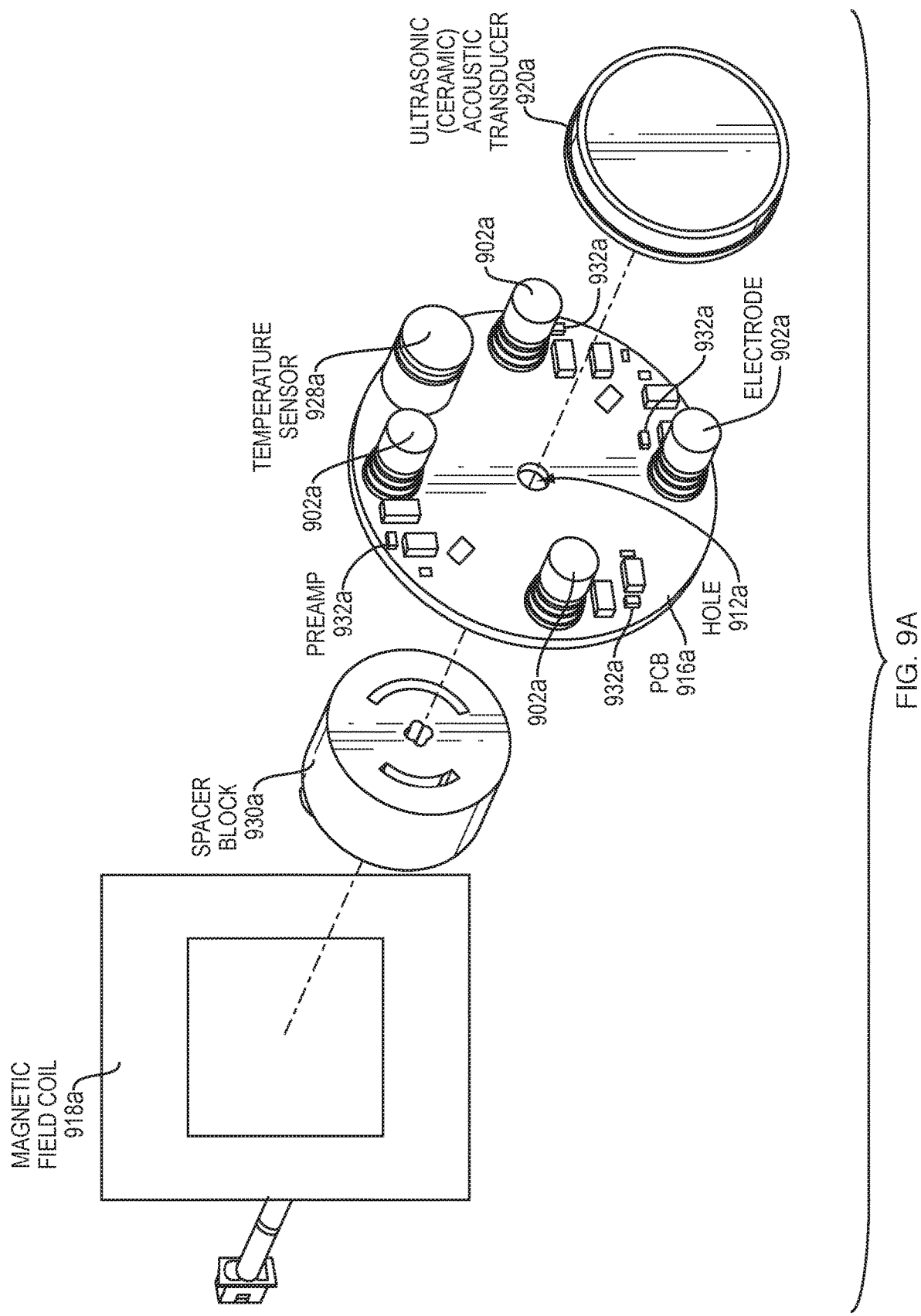
FIG. 9A is an exploded view of a portion of the assembly shown in FIGS. 4 and 5, according to an embodiment with a non-cylindrical coil.

FIGS. 9A-B illustrate embodiments including a non-cylindrical coil in the case where the mag field and pin placement are not rotationally symmetric about the central axis. In embodiments, FIGS. 9A-B illustrate a stop-sign shaped coil (918a, 918b, respectively) and non-square pin locations (i.e. a rectangle that is almost a square).

FIG. 9A is an exploded view of a portion of the assembly shown in FIGS. 4 and 5, according to an embodiment. Like in FIG. 6, FIG. 9A illustrates a magnetic field coil 918a, spacer block 930a, temperature sensor 928a, preamps 932a, PCB 916a, a central hole 912a in the PCB, electrodes 902a, and transducer 920a. In an embodiment, shown in FIG. 9A, the magnetic field coil 918a is non-cylindrical.

FIG. 9B is an exploded view of a portion of the assembly shown in FIGS. 4 and 5, according to an embodiment. Like in FIG. 6, FIG. 9B illustrates a magnetic field coil 918b, spacer block 930b, temperature sensor 928b, preamps 932b, PCB 916b, an optional hole 912b in the PCB, electrodes 902b, and transducer 920b. In an embodiment, shown in FIG. 9B, not only is the magnetic field coil 918b non-cylindrical, but also the PCB 916b is non-circular, and the plate (not shown in FIG. 9B, see element 610 of FIG. 6) is non-circular.

FIGS. 10A-C are perspective views of a portion of the assembly shown in FIGS. 4 and 5, according to an embodiment. Like in FIG. 6, FIGS. 10A-C collectively illustrate a magnetic field coil 1018 (electromagnet), preamps 1032, PCB 1016, central hold 1012, electrodes 1002, and transducer 1020, as well as a cable 1038.

Figure 11:
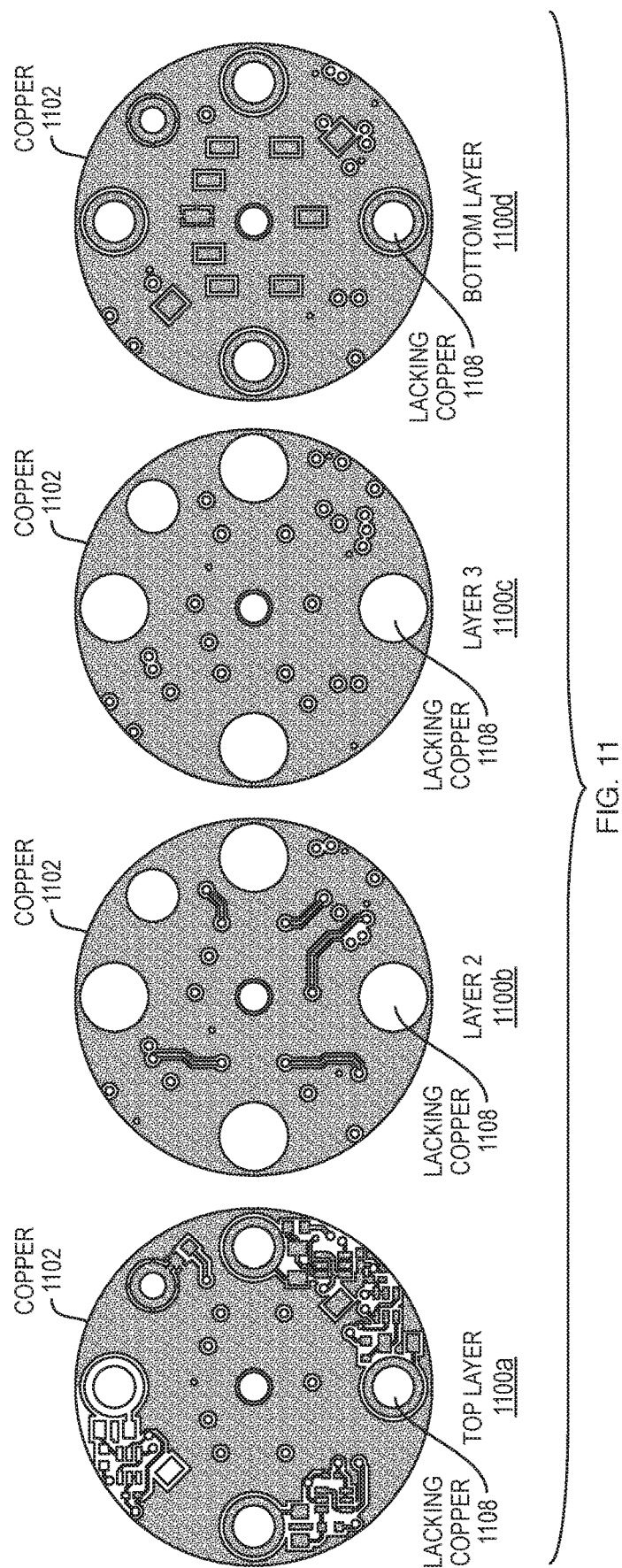
FIG. 11 is an exploded view of a printed circuit board (PCB) portion of the assembly shown in FIGS. 6-10, according to an embodiment.

FIG. 11 is an exploded view of a printed circuit board (PCB) portion of the assembly shown in FIGS. 6-10, according to an embodiment. FIG. 11 illustrates the use of copper "flooding" in the PCB artwork to provide electromagnetic shielding. In other words, FIG. 11 illustrates Electrode PCB layers 1100a, 1100b, 1100c, 1100d showing use of flooded copper (black color in images) 1102 to provide shielding for electrode signals, reducing the potential for electrical interference. In FIG. 11, regions shown in black are copper 1102 and white regions 1108 lack copper 1102. The copper metal 1102 acts as shielding.

Figure 12:
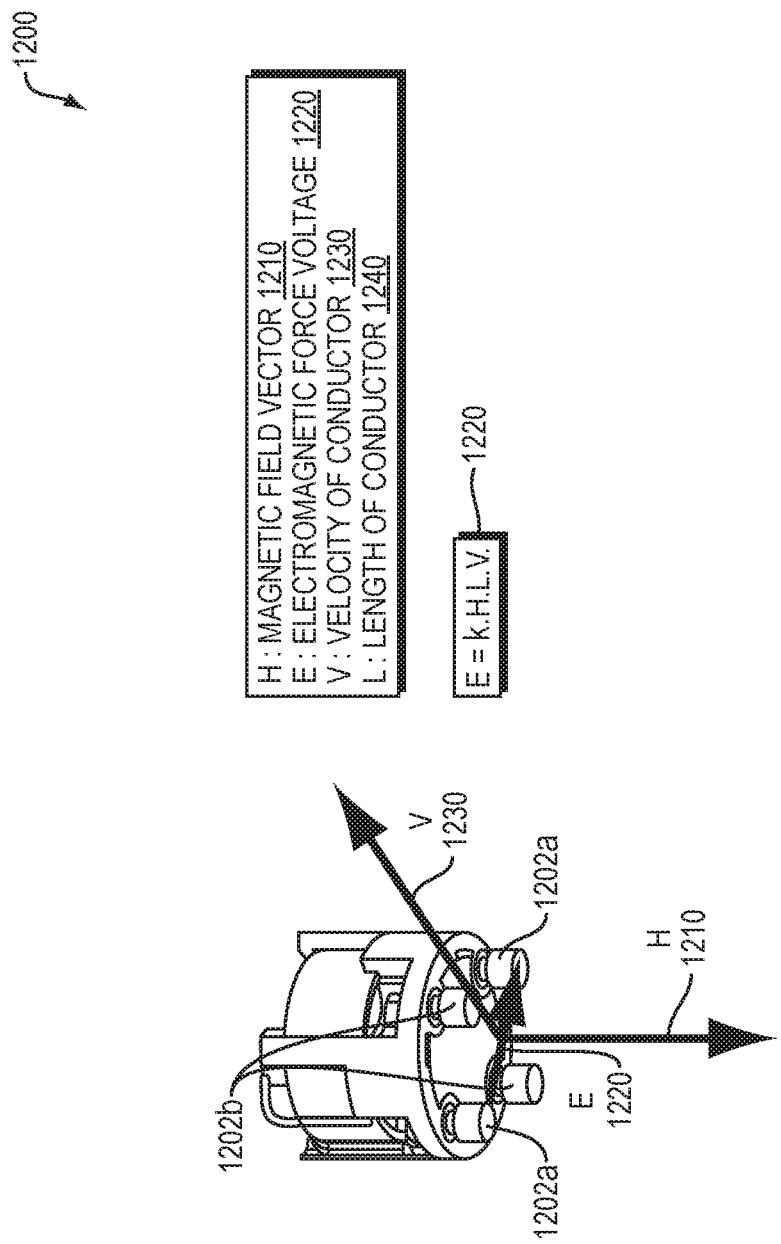
FIG. 12 is a perspective view of a dual-axis speed sensor illustrating principles of operation.

FIG. 12 is a perspective view of a dual-axis speed sensor illustrating principles of operation. The dual-axis speed sensor as shown includes a coil and four electrodes (electrode pairs 1202a, 1202b) arranged in a cross configuration. An electromagnetic speedometer 1200 uses the Faraday's law principle of electromagnetic induction. This is the principle that any conductor which is moved across a magnetic field will have a small electromagnetic force induced. In the case of the speed sensor for use in measuring speed of a marine vessel, the conductor is usually seawater and is considered stationary in a moving magnetic field. With a magnetic field that remains constant and a conductor that is of a known size, then the electromagnetic force amplitude is directly proportional to speed of movement of the device.

The magnetic field is created by the field coil inside the sensor, and this field is extended into the seawater. Pins, acting as electrodes (electrode pairs 1202a, 1202b), sense an induced voltage, based on movement of the sensor, i.e., the vessel to which the sensor is attached. The amplitude of the induced voltage is dependent on the cutting plane created with magnetic field lines of force.

As shown in FIG. 12, the field coil generates a magnetic field H (1210) perpendicular to a flow speed vector V (1230). The equation for the electromagnetic force E (1220) is given as:

E=kHLV, where k is a calibration constant, H (1210) is the magnetic field, L (1240) is the length of the conductor and V (1230) is velocity of the conductor.

As known to one skilled in the art, Fleming's right-hand rule may represent the direction of an induced current when a conductor is attached to a circuit and moves in a magnetic field. Embodiments may use Fleming's right-hand rule to determine the direction of current in the field coil of FIG. 12 (windings of a generator).

As illustrated in FIG. 12, Fleming's right-hand rule shows that the generated E (1220) is at right angles with H (1210) and V (1230). Assuming H (1210) is DC and regulated, L (1240) is the length of the wires which is constant and known, k is also known from calibration, then E (1220) measured is directly related to V (1230).

As illustrated in FIG. 12, there are four electrode pins (electrode pairs 1202a, 1202b) arranged in a cross: two pins 1202a sense the longitudinal component of the speed vector, and the other two pins 1202b sense the transverse component of the speed vector. The electromagnetic voltage induced is very small, in the range of 10 to 100 micro-volt typically, depending on the magnetic field.

The electromagnetic force is understood to be independent of the water impedance, as long as the water impedance is small relative to an input impedance of the input amplifier of the speed sensor. Note that in very still water, impedance is high, making the conductor more prone to sense noise, so signal to noise ratio decreases and eventually, noise could saturate the sensor.

Note that the electromagnetic voltage can be increased by any of (i) increasing the energizing current of the field coil, (ii) increasing the number of turn wires of the coil, and (iii) increasing the strength of the field using higher permeability material for the coil core, or any combination of (i)-(iii).

Figure 13:
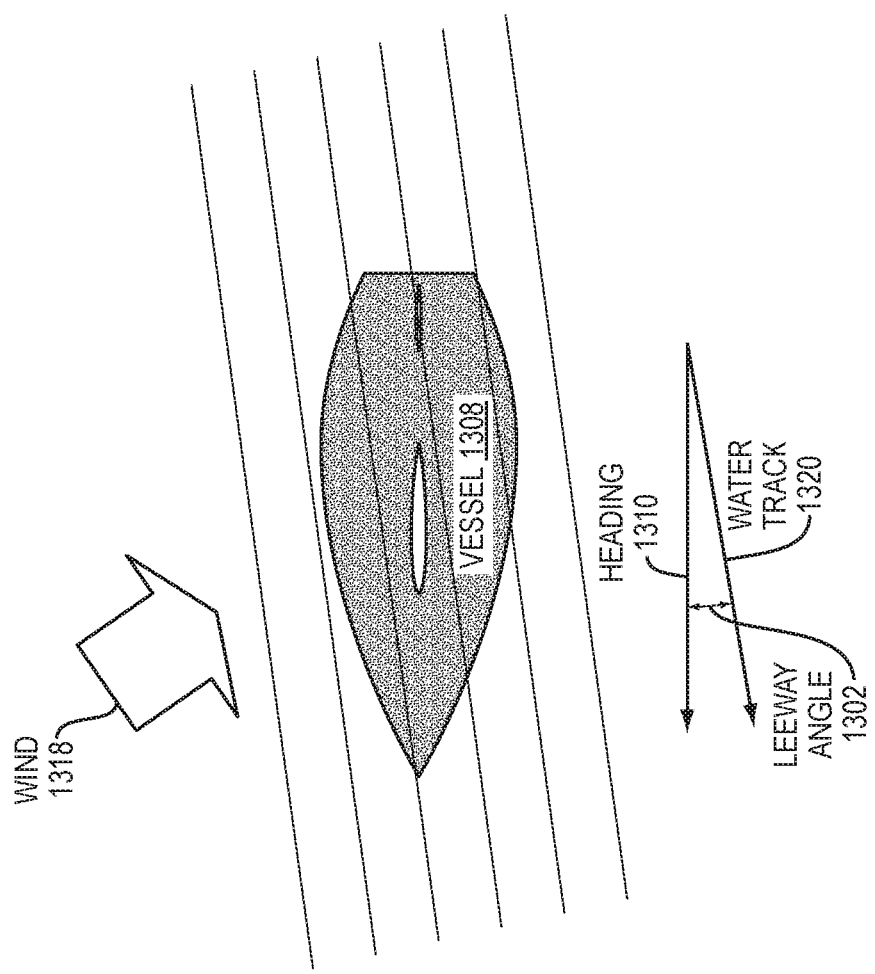
FIG. 13 is a schematic diagram illustrating leeway angle.

FIG. 13 is a schematic diagram illustrating leeway angle 1302. A vessel 1308 may drift due to wind 1318. The dual-axis speed sensor measures accurately the longitudinal speed component $V_L$ (1310) and the transverse speed component $V_T$ (1320). The data derived from these two speed components 1310, 1320 may allow a user to change the course of the vessel 1308 to optimize vessel course by computing drift angle 1302 (also called leeway angle). Drift angle is the arctangent of the ratio between $V_L$ (1310) and $V_T$ (1320).

Figure 14:
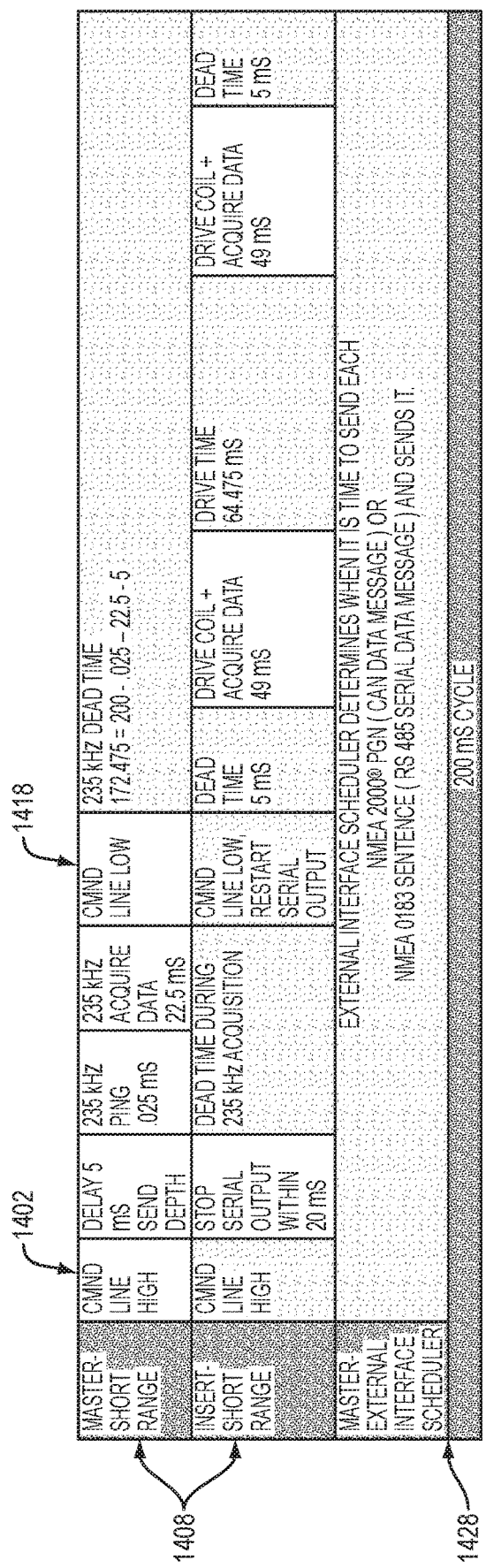
FIGS. 14 and 15 are example timing diagrams of the system shown in FIG. 2.
Figure 15:
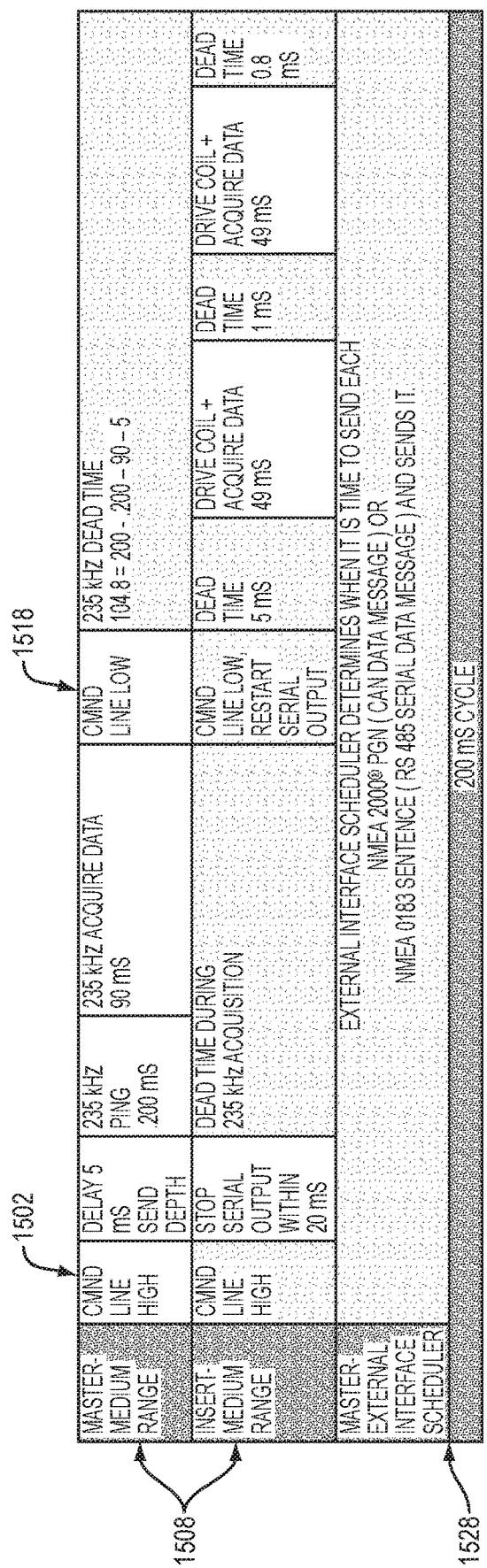

FIGS. 14 and 15 are example timing diagrams of the system shown in FIGS. 2 and 3. As illustrated in FIGS. 14-15, at least one controller (controllers 212a, 212b of FIG. 2) may be configured to interleave the speed data and the depth data acquired. FIG. 14 illustrates timing for a short-range 1408, shallow water depth detection. FIG. 15 illustrates timing for a medium-range 1508, deeper water depth detection. Because of the close proximity of the piezoceramic transducer to the coil and electrodes, it has been discovered that an interleaving scheme (shown in FIGS. 14-15) may be used to avoid EMI interference between depth sensing operation and EM speed sensing operation.

As noted above, the depth transceiver/control module 12 (and its controller 212a of FIG. 2), which primarily performs depth measurements, serves as the master and controls the command line (of the bus 256c between master 12 and slave 14, referring to FIG. 2). As shown in FIGS. 14-15, when the command line is high (1402 of FIG. 14, 1502 of FIG. 15, respectively), the depth sensing controlled by the depth transceiver/control module 12 is active and the sensor assembly 14, acting as slave, stops driving the coil and sending serial output (along bus 256c between master 12 and slave 14, referring to FIG. 2). As shown in FIGS. 14-15, after a period of time for depth pinging and data acquisition, e.g., 0.025 ms ping (~9 wave cycles) and 22.5 ms data acquisition in short range 1408 or 0.200 ms ping (~72 wave cycles) and 90 ms data acquisition in medium range 1508, the master sets the command line low (1418 of FIG. 14, 1518 of FIG. 15, respectively). With the command line low (1418 of FIG. 14, 1518 of FIG. 15, respectively), the master stops depth sensing and the slave 14 (and its controller 212b of FIG. 2) (re)starts speed sensing for a period of time, e.g., 49 ms drive coil and data acquisition.

Differences between the two depth ranges (short range 1408 and medium range 1508) include, but are not limited to: (1) amount of time the master needs to ping and acquire data; and (2) amount of dead time the slave places before and after the second coil drive/acquire data sequence.

The sequence shown in FIGS. 14 and 15 occur five times per second, which means the slave has 10 coil drive/acquire data sequences per second.

The system 10 is capable of transitioning from short range 1408 to medium range 1508 and/or from medium range 1508 to short range 1408, which enables the system 10 to operate properly as the depth of water changes.

The system 10 can operate over either the NMEA 2000® (CAN) or the NMEA 0183 Serial external communications interface. Either interface is controlled by a scheduler (1428 of FIG. 14, 1528 of FIG. 15, respectively) that determines when it is the appropriate time to send each NMEA 2000 PGN (CAN data message) or NMEA 0183 Sentence (RS485 serial data message) and sends it. The scheduler (1428 of FIG. 14, 1528 of FIG. 15, respectively) is free to output its data whenever it is ready, however, there are a few critical periods when it may be held off briefly by a higher priority task (such as the depth task) or an interrupt.

For NMEA 2000®, the default settings output is about eight PGNs from 1 to 5 times/second depending on the PGN. For NMEA 0183, the default settings output is about six Sentences from 1 to 5 times/second depending on the Sentence.

Figure 16:
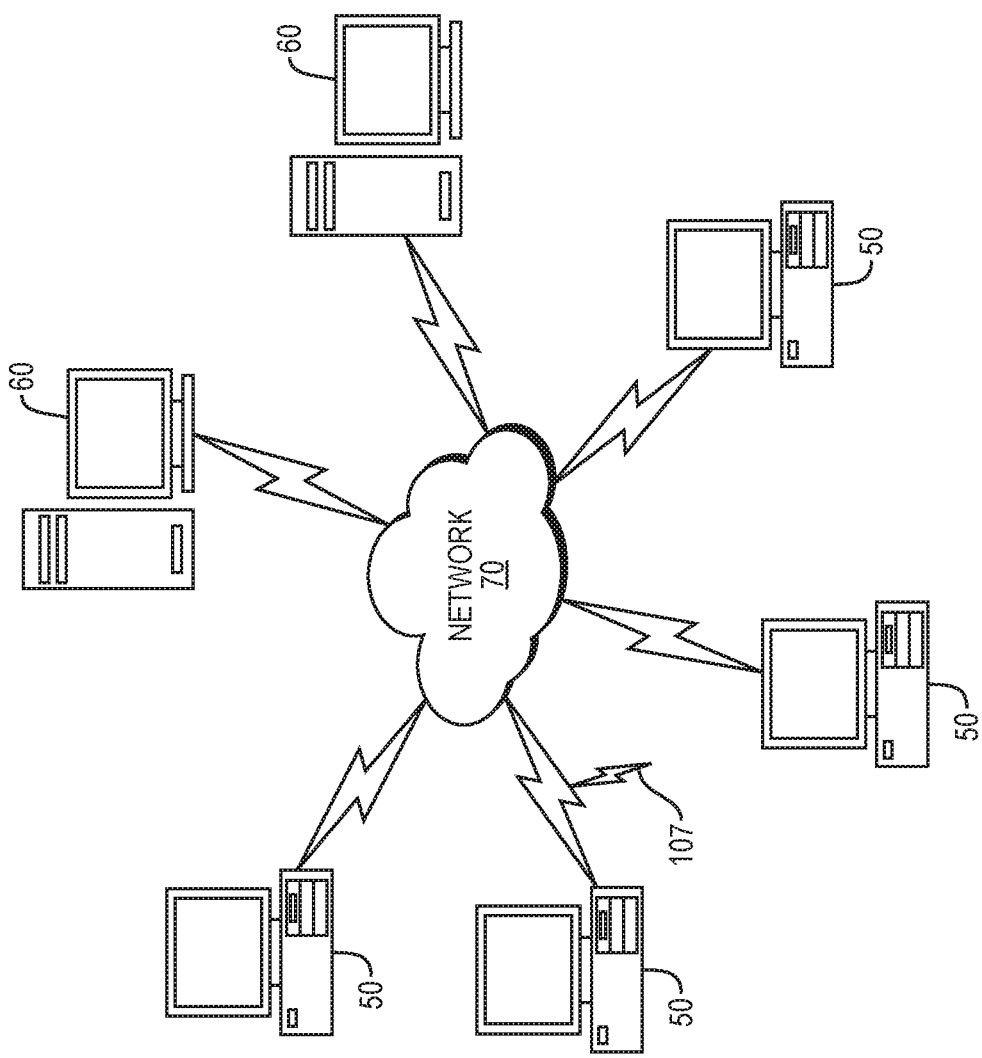
FIG. 16 illustrates a computer network (or apparatus, or system) or similar digital processing environment, according to some embodiments of the present disclosure.

FIG. 16 illustrates a computer network (or system) 10 or similar digital processing environment, according to some embodiments of the present disclosure. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured with one or more controllers (located at one or more of elements 50, 60, and/or 70). In some embodiments, a user may access the one or more controllers executing on the server computers 60 from a user device, such a mobile device, a personal computer, or any computing device known to one skilled in the art without limitation. According to some embodiments, the client devices 50 and server computers 60 may be distributed across one or more controllers.

Server computers 60 may be configured as the one or more controllers which communicate with client devices 50 for providing access to (and/or accessing) databases that include speed data and depth data. The server computers 60 may not be separate server computers but part of cloud network 70. In some embodiments, the server computer (e.g., one or more controllers) may enable users to determine speed data, depth data, or both speed data and depth data by allowing access to data located on the client 50, server 60, or network 70 (e.g., global computer network). The client (configuration module) 50 may communicate data representing the speed data and depth data back to and/or from the server (one or more controllers) 60. In some embodiments, the client 50 may include client applications or components executing on the client 50 for acquiring speed data and depth data, and the client 50 may communicate corresponding data to the server (e.g., one or more controllers) 60.

Some embodiments of the system 10 may include a computer system for acquiring speed data and depth data. The system 10 may include a plurality of processors 84. The system 10 may also include a memory 90. The memory 90 may include: (i) computer code instructions stored thereon; and/or (ii) data representing location, size, or number of physical objects. The data may include speed data and depth data. The memory 90 may be operatively coupled to the plurality of processors 84 such that, when executed by the plurality of processors 84, the computer code instructions may cause the computer system 10 to implement one or more controllers (the one or more controllers being located on, in, or implemented by any of elements 50, 60, 70 of FIG. 16 or elements 82, 84, 86, 90, 92, 94, 95 of FIG. 17) configured to perform one or more functions.

Figure 17:
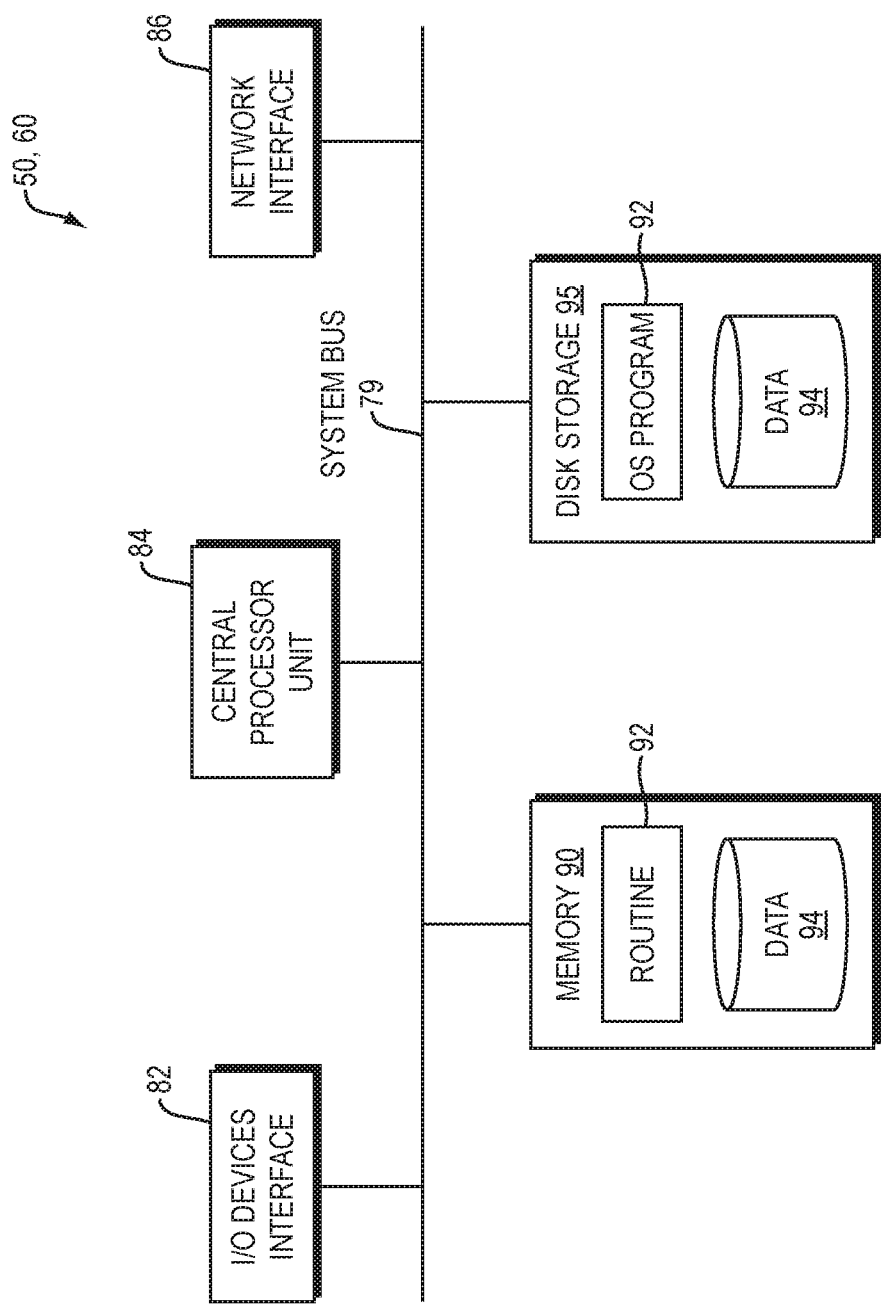
FIG. 17 illustrates a diagram of an example internal structure of a computer (e.g., client processor/device or server computers) in the computer system (and apparatus) of FIG. 16, according to some embodiments of the present disclosure.

According to some embodiments, FIG. 17 is a diagram of an example internal structure of a computer (e.g., client processor/device 50 or server computers 60) in the computer system 10 of FIG. 16. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 16). Memory 90 provides volatile storage for computer software instructions 92 and data 94 used to implement some embodiments (e.g., multiuser site, configuration module, and/or administration module engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the present disclosure. The computer program product 92 can be installed by any suitable software installation procedure, as is well known in the art. In another embodiment, at least a portion of the software instructions may also be downloaded over a cable, communication and/or wireless connection. Other embodiments may include a computer program propagated signal product 107 (of FIG. 16) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92 of the present disclosure.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In one embodiment, the information stored in memory (such as EEPROM associated with the microcontrollers) may comprise a computer program product, such that the memory may comprise a non-transitory computer-readable medium (e.g., a removable storage medium such as one or more DVD-ROM's, CD-ROM's, diskettes, tapes, thumb drive, etc.) that provides at least a portion of the software instructions for the system. The computer program product can be installed by any suitable software installation procedure, as is well known in the art. In another embodiment, at least a portion of the software instructions may also be downloaded over a cable communication and/or wireless connection.

Embodiments or aspects of the present invention may be implemented in the form of hardware, software, or firmware. If implemented in software, the software may be any form of software capable of performing operations consistent with the example embodiments disclosed herein. The software may be stored in any non-transitory computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

Some embodiments include shielded copper traces in a multilayer PCB. The shielded copper traces provide multiple advantages including but not limited to reduction in electrical interference. In other words, the copper metal acts as shielding for electrode signals, reducing the potential for electrical interference.

It is also possible to use an amplifier positioned close to the electrodes to buffer the signal to the measuring circuit, overcoming potential noise issues.

While this invention has been particularly shown and described with references to example embodiments thereof, it will be understood by those skilled in the art that various changes in form and details may be made therein without departing from the scope of the invention encompassed by the appended claims.

What is claimed is:

1. A system for performing multiple measurement functions comprising:
   an electromagnetic speed sensor comprising:
      a coil;
      a dual-axis electrode subassembly positioned coaxially with the coil and having a first pair of electrodes spaced apart on a first axis and a second pair of electrodes spaced apart on a second axis at an angle relative to the first axis;
      a driver circuit electrically coupled to the coil for driving the coil with a coil drive signal to produce an electromagnetic force vector in a direction perpendicular to a plane defined by the first and second pairs of electrodes; and
      a data acquisition circuit electrically coupled to the dual-axis electrode subassembly and configured to acquire speed data based on a first voltage induced across the first pair of electrodes and a second voltage induced across the second pair of electrodes;
   a depth sensor comprising:
      a transducer; and
      a transceiver configured to drive the transducer with a transducer drive signal and to receive echo signals from the transducer to acquire depth data; and
   at least one controller configured to control the driver circuit, the data acquisition circuit and the transceiver, the at least one controller configured to interleave the speed data and the depth data acquired.

2. The system of claim 1 wherein the electromagnetic speed sensor further comprises a set of preamplifiers, each preamplifier of the set being electrically coupled to and co-located with a corresponding electrode of the first and second pairs of electrodes, and each preamplifier providing preamplification that reduces electromagnetic interference, at the corresponding electrode, of the first and second voltages.

3. The system of claim 2 wherein the preamplification is unity gain preamplification.

4. The system of claim 1 further comprising a plurality of electromagnetic speed sensors that includes the electromagnetic speed sensor.

5. The system of claim 4 where each of the electromagnetic speed sensors of the plurality operates at a same or different frequency with respect to each other of the electromagnetic speed sensors of the plurality.

6. The system of claim 1 further comprising a first housing for containing the electromagnetic speed sensor and the transducer, the first housing having a proximal end and a distal end, the proximal end configured for extending into a vessel and the distal end configured for extending into water.

7. The system of claim 6 further comprising a second housing for containing the depth sensor transceiver.

8. The system of claim 1 wherein the dual-axis electrode subassembly includes a plate to which the four electrodes are mounted, each electrode having a wire connected thereto that is routed from the electrode towards an exit hole at the center of the plate, the exit hole coaxial with the coil to minimize offset between the first voltage and the second voltage.

9. The system of claim 8 wherein the plate is a circular plate.

10. The system of claim 8 wherein the wires are guided radially inward toward the exit hole.

11. The system of claim 1 wherein the at least one controller includes a first controller and a second controller, wherein the second controller is a master and the first controller is a slave, the second controller controlling a command signal coupled from the second controller to the first controller, wherein if the command signal is in a first state, the depth sensor is active and the electromagnetic speed sensor is inactive and wherein if the command signal is in a second state, the depth sensor is inactive and the electromagnetic speed sensor is active.

12. The system of claim 11 wherein the second controller toggles between the first state and the second state periodically.

13. The system of claim 1 further comprising a temperature sensor and an inertial measurement unit (IMU).

14. The system of claim 13 wherein data acquired from the inertial measurement unit (IMU) is used to correct the speed data.

15. The system of claim 13 further comprising at least one of:
   a wireless transceiver configured for communication of any of the speed data, the depth data, temperature data of the temperature sensor and inertial measurement unit (IMU) data of the inertial measurement unit (IMU); and
   a network transceiver configured for communication of any of the speed data, the depth data, temperature data of the temperature sensor and the inertial measurement unit (IMU) data of the inertial measurement unit (IMU) to a network bus.

16. The system of claim 1 wherein at least one of:
   the transducer is positioned coaxially with the coil; and
   the at least one controller controls the electromagnetic speed sensor and the depth sensor such that in a first state, the depth sensor is active and the electromagnetic speed sensor is inactive and in a second state, the depth sensor is inactive and the electromagnetic speed sensor is active.

17. A method for performing multiple measurement functions comprising:
   at an electromagnetic speed sensor having a coil and a dual-axis electrode subassembly positioned coaxially with the coil and having a first pair of electrodes spaced apart on a first axis and a second pair of electrodes spaced apart on a second axis at an angle relative to the first axis,
      driving the coil with a coil drive signal to produce an electromagnetic force vector in a direction perpendicular to a plane defined by the first and second pairs of electrodes;
      acquiring speed data based on a first voltage induced across the first pair of electrodes and a second voltage induced across the second pair of electrodes;
   at a depth sensor having a transducer and a transceiver,
      driving the transducer with a transducer drive signal; and
      receiving echo signals from the transducer to acquire depth data; and
   by at least one controller, controlling the driving the coil, the acquiring the speed data, the driving the transducer, and the receiving the echo signals from the transducer, and interleaving the speed data and the depth data acquired.

18. The method of claim 17 further comprising, at the electromagnetic speed sensor having a set of preamplifiers, where each preamplifier of the set is electrically coupled to and co-located with a corresponding electrode of the first and second pairs of electrodes, providing preamplification by each preamplifier at the corresponding electrode, of the first and second voltages, each preamplifier reducing electromagnetic interference.

19. The method of claim 18 wherein the preamplification is unity gain preamplification.

20. A computer program product comprising:
a non-transitory computer-readable medium comprising one or more sets of computer executable instructions, the instructions, when loaded and executed by a processor, cause the processor to:
at an electromagnetic speed sensor having a coil and a dual-axis electrode subassembly positioned coaxially with the coil and having a first pair of electrodes spaced apart on a first axis and a second pair of electrodes spaced apart on a second axis at an angle relative to the first axis,
drive the coil with a coil drive signal to produce an electromagnetic force vector in a direction perpendicular to a plane defined by the first and second pairs of electrodes;
acquire speed data based on a first voltage induced across the first pair of electrodes and a second voltage induced across the second pair of electrodes;
at a depth sensor having a transducer and a transceiver, drive the transducer with a transducer drive signal; and receive echo signals from the transducer to acquire depth data; and
by at least one controller, control the driving the coil, the acquiring the speed data, the driving the transducer, and the receiving the echo signals from the transducer, and interleave the speed data and the depth data acquired.

21. A method comprising:
at a speed sensor, operating the speed sensor to acquire speed data in a first interval;
at a depth sensor, operating the depth sensor to acquire depth data in a second interval; and
interleaving the speed data and the depth data acquired.

22. A computer program product comprising:
a non-transitory computer-readable medium comprising one or more sets of computer executable instructions, the instructions, when loaded and executed by a processor, cause the processor to:
at a speed sensor, operate the speed sensor to acquire speed data in a first interval;
at a depth sensor, operate the depth sensor to acquire depth data in a second interval; and
interleave the speed data and the depth data acquired.

* * * * *